(12) United States Patent
DeNap et al.

(10) Patent No.: US 6,490,273 B1
(45) Date of Patent: Dec. 3, 2002

(54) ASYNCHRONOUS TRANSFER MODE ARCHITECTURE MIGRATION

(75) Inventors: Frank Anthony DeNap, Millbrae, CA (US); Harold Wayne Johnson, Lenexa, KS (US); Bryan Lee Gorman, Mission, KS (US); William Lee Edwards, Overland Park, KS (US); Michael Thomas Swink, Lenexa, KS (US); Timothy Gene Kelley, Shawnee, KS (US); James William Baumgart, Valley Center, CA (US); Martin Joseph Kaplan, Olathe, KS (US); Abdullah Murat Bog, Milpitas, CA (US); John Arndt Strand, III, Leavenworth, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/129,249

(22) Filed: Aug. 5, 1998

(51) Int. Cl.[7] .......................... H04L 12/66; H04L 12/28
(52) U.S. Cl. ..................... 370/352; 370/395.1; 370/409
(58) Field of Search ................................. 370/352, 353, 370/354, 355, 356, 395.7, 395.51, 395.52, 395.53, 395.6, 400, 401, 396, 395.5, 395.54, 409

(56) References Cited

U.S. PATENT DOCUMENTS

| | | | | |
|---|---|---|---|---|
| 5,345,445 A | * | 9/1994 | Hiller et al. ................. | 370/397 |
| 5,490,141 A | * | 2/1996 | Lai et al. ..................... | 370/352 |
| 5,930,238 A | * | 7/1999 | Nguyen ................. | 370/395.53 |
| 6,049,531 A | * | 4/2000 | Roy ............................. | 370/352 |
| 6,075,784 A | * | 6/2000 | Frankel et al. ............... | 370/352 |
| 6,141,339 A | * | 10/2000 | Kaplan et al. ............... | 370/352 |
| 6,339,594 B1 | * | 1/2002 | Civanlar et al. ............. | 370/352 |

* cited by examiner

Primary Examiner—Chau Nguyen
Assistant Examiner—Andy Lee
(74) Attorney, Agent, or Firm—Harley R. Ball; Steven J. Funk; Kevin D. Robb

(57) ABSTRACT

The invention comprises a series of architectures that are implemented in four phases to provide a migration path from an initial ATM service offering to a full service ATM network. The initial ATM network includes several metropolitan ATM networks that are interconnected by a core ATM network. Each metropolitan ATM network includes a service node that controls ATM network elements to deliver services. In Phase I, a business hub that is connected to the metropolitan ATM network integrates voice, data, and Internet traffic over a single ATM connection that contains permanent Virtual Connections (PVCs) to various destinations, such as other business hubs, a gateway to local and long distance networks, the Internet, a frame relay network. In Phase II, the architecture is extended to smaller business markets. Businesses are provided with the PVC-based ATM service using xDSL/ATM connections that are multiplexed at a central office and then provided to the service node over the metropolitan ATM network. A remote dial-in feature is also added. In Phase III, a work-at-home hub is provided for telecommuting. The work-at-home hub uses an xDSL/ATM connection through the central office to the service node. Phase III also includes the deployment of a session manager and provider agents that interact to interpret user requests and establish the requisite communications paths using Switched Virtual Connections (SVCs). The business can replace existing some or all PVC-based service with more efficient SVC-based service. In Phase IV, the architecture is extended to the residential market. A residential hub is provided for residential communications over an xDSL/ATM connection through the central office to the service node. An analog hub is provided for conventional telephone service through the service node.

34 Claims, 21 Drawing Sheets

ASYNCHRONOUS TRANSFER MODE ARCHITECTURE MIGRATION

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The invention relates to communications systems, and in particular, to communications systems that provide voice telephony service using Asynchronous Transfer Mode (ATM).

2. Background

Asynchronous Transfer Mode (ATM) networks are being designed and deployed. ATM is the well-known communications format that is based on a 53-byte cell that includes a five-byte header identifying the virtual connection. ATM cells are designed to carry voice, video, and data traffic within the same communications system. ATM hubs, ATM metropolitan networks, and ATM core networks that transfer ATM cells are well known.

Businesses have increasing communications needs. Most large businesses transmit voice and data traffic over dedicated connections between their various business sites. These large businesses also transmit voice and data over switched connections provided by the Public Switched Telephone Network (PSTN). In addition, these businesses have data networks, such as intranets and frame relay systems.

Residential consumers also have increasing communications needs. These consumers want more communications channels and more bandwidth per channel. The residential consumer also desires more access to media-based services. Despite these technical advances, many residential consumers will still retain their existing telephone devices and will continue to retain conventional telephone service for these devices.

Various ATM deployments are possible to serve business and residential markets, but a problem arises when determining what ATM services should be offered initially and which services added later. This problem is complicated when the various market segments are analyzed. The large business market needs different service offerings than the smaller business market. Both business markets need different service offerings than the residential market.

Deploying a full-service ATM network that serves all markets all at once would be cost prohibitive and extremely complex. A phased approach is needed that provides a migration path from initial service offerings to the full-service ATM network. During the migration, the approach should intelligently offer services that are targeted at the different market segments.

SUMMARY

The invention overcomes the above problems by providing a series of architectures that form an incremental migration from initial ATM service offerings to a full service ATM network. The phase I architecture includes several metropolitan ATM networks that are interconnected by a core ATM network. Each metropolitan ATM network includes a service node that controls the ATM network elements that deliver the services.

In Phase I, the business hubs are connected to the metropolitan ATM network over a single ATM connection that integrates voice, data, and Internet traffic. The ATM connection contains Permanent Virtual Connections (PVCs) to various destinations, such as other business hubs, local telephone networks, long distance telephone networks, the Internet, and a frame relay network. In Phase II, the architecture is extended to the smaller business market by providing businesses with PVC-based ATM service using xDSL/ATM connections that are multiplexed at a central office and then provided to the service node over the metropolitan ATM network. In Phase III, a work-at-home hub that uses an xDSL/ATM connections is provided for telecommuting. Phase III also includes the deployment of a session manager and provider agents that interact to interpret user requests and establish the requisite communications paths using Switched Virtual Connections (SVCs). The businesses can replace some or all of their PVC-based service with more efficient SVC-based service. In Phase IV, the architecture is extended to the residential market. A residential hub is provided for residential communications over an xDSL/ATM connection through the central office to the service node. An analog hub is provided for conventional telephone service through the service node.

The first ATM architecture provides ATM PVC-based services to businesses to integrate business communications over a single ATM pipe. The first ATM architecture is comprised of networks, hubs, and Permanent Virtual Connections (PVCs). A core ATM network is connected to a first metropolitan ATM network and a second metropolitan ATM network. The first metropolitan ATM network is connected to a first business hub and a second business hub. The second metropolitan ATM network is connected to a third business hub. The business hubs interwork between ATM and the plurality of different formats, such as ethernet, T1, frame relay, internet protocol, and DS3. The first ATM architecture includes: 1) a first ATM PVC from the it first business hub to the second business hub through the first metropolitan ATM network, 2) a second ATM PVC from the first business hub to a gateway through the first metropolitan ATM network wherein the gateway interworks the second ATM PVC with a connection to a local telephone network, 3) a third ATM PVC from the first business hub to the gateway through the first metropolitan ATM network wherein the gateway interworks the third ATM PVC with a connection to a long distance telephone network, 4) a fourth ATM PVC from the first business hub to a data network through the first metropolitan ATM network and the core ATM network, and 5) a fifth ATM PVC from the first business hub to the third business hub through the first metropolitan ATM network, the core ATM network, and the second metropolitan ATM network.

The second network architecture extends the PVC-based services to the small business market and is created by adding DSL-based multiplexers and hubs. An ATM access multiplexer is connected to the first metropolitan ATM network and a Digital Subscriber Line (DSL) multiplexer is connected to the ATM access multiplexer. A fourth business hub is connected to the DSL multiplexer over a DSL/ATM connection.

The third network architecture is created by adding work-at-home hubs, a session manager, and provider agents. The work-at-home hubs interwork between ATM and a plurality of different formats and are connected to the Digital Subscriber Line (DSL) multiplexer. A provider agent is added to the large business hubs, the small business hubs, the work-at-home hubs, and the PSTN gateway. The session manager interacts with the provider agents to establish SVC-based ATM connections in response to user requirements. In the third network architecture, a business will typically replace some or all of the PVCs used in previous architectures with SVC-based ATM connections because the SVC-based connections are more efficient from a bandwidth and cost perspective.

The fourth network architecture is created by adding a plurality of residential hubs that interwork between ATM and a plurality of different formats and that are each connected to the Digital Subscriber Line (DSL) multiplexer. The fourth network architecture also adds a plurality of analog hubs that interwork between ATM and conventional telephony and that are each connected to the metropolitan ATM network. A provider agent is added to each of the residential hubs and the analog hubs to interact with the session manager to establish SVC-based ATM connections in response to user requests. The fourth network architecture expands the full service ATM network to the residential market, but still provides conventional telephony for those who desire it.

DETAILED DESCRIPTION

On the figures, the first digit(s) of a reference number for an element indicate the first figure that the element appears on. The following are hereby incorporated by reference into this Patent Application: U.S. Pat. No. 6,141,339 assigned to the same entity as this Patent Application; U.S. Pat. No. 6,229,803 assigned to the same entity as this Patent Application; U.S. patent application Ser. No. 09/129,268 entitled "Telecommunications Provider Agent", and assigned to the same entity as this Patent Application; and U.S. patent application Ser. No. 09/129,248 entitled "Asynchronous Transfer Mode System for Providing Telephony Service" now U.S. Pat. No. 6,407,997, and assigned to the same entity as this Patent Application.

The invention comprises a series of architectures that are implemented in four phases to provide a migration path from an initial ATM service offering to a full service ATM network. The initial ATM network includes several metropolitan ATM networks that are interconnected by a core ATM network. Each metropolitan ATM network includes a service node that controls ATM network elements to deliver services. In Phase I, a business hub that is connected to the metropolitan ATM network integrates voice, data, and Internet traffic over a single ATM connection that contains permanent Virtual Connections (PVCs) to various destinations, such as other business hubs, a gateway to local and long distance networks, the Internet, a frame relay network. In Phase II, the architecture is extended to smaller business markets. Businesses are provided with the PVC-based ATM service using xDSL/ATM connections that are multiplexed at a central office and then provided to the service node over the metropolitan ATM network. A remote dial-in feature is also added. In Phase III, a work-at-home hub is provided for telecommuting. The work-at-home hub uses an xDSL/ATM connection through the central office to the service node. Phase III also includes the deployment of a session manager and provider agents that interact to interpret user requests and establish the requisite communications paths using Switched Virtual Connections (SVCs). The business can replace existing some or all PVC-based service with more efficient SVC-based service. In Phase IV, the architecture is extended to the residential market. A residential hub is provided for residential communications over an xDSL/ATM connection through the central office to the service node. An analog hub is provided for conventional telephone service through the service node.

Figure 1:
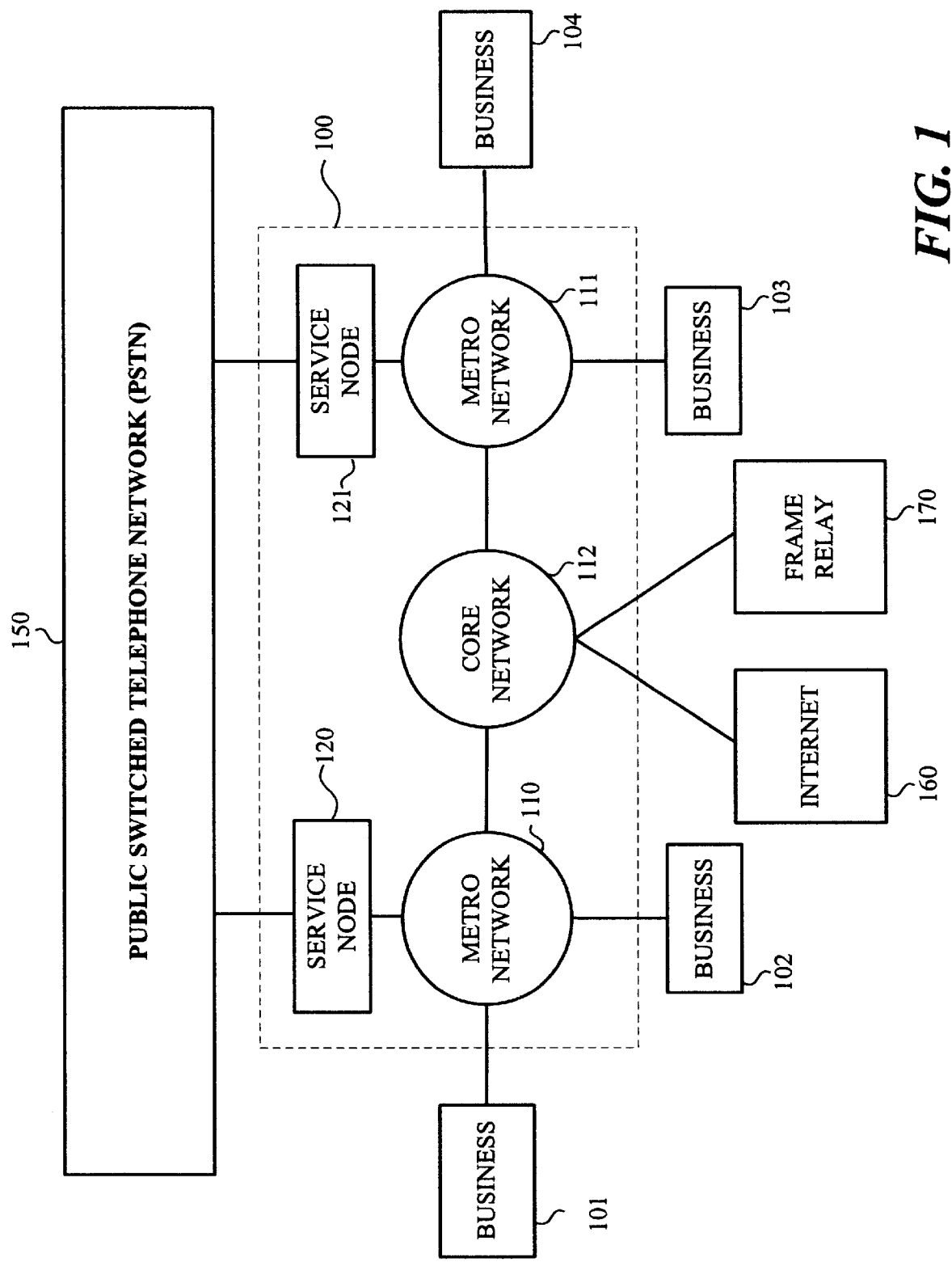
FIG. 1 is a block diagram of a Phase I architecture for some embodiments of the invention.

Phase 1 Network Architecture—FIG. 1

FIG. 1 depicts a Phase I architecture for an Asynchronous Transfer Mode (ATM) network 100 for some embodiments of the invention. The ATM network 100 interconnects businesses 101, 102, 103, and 104 with each other and with the Public Switched Telephone Network (PSTN) 150, the Internet 160, and the frame relay network 170. The ATM network 100 is comprised of metropolitan ATM networks 110–111, a core ATM network 112, and service nodes 120–121. The metropolitan ATM network 110 is connected to the businesses 101–102, the service node 120, and the core ATM network 112. The metropolitan ATM network 111 is connected to the businesses 103–104, the service node 121, and the core ATM network 112. The service nodes 120–121 are connected the PSTN 150. The core ATM network 112 is connected to the Internet 160 and the frame relay network 170.

The businesses 101–104 are commercial enterprises that have equipment for exchanging ATM cells with the ATM network 100. The metropolitan ATM networks 110 and 111 are Broadband Metropolitan Area Networks (BMAN) that are comprised of four-fiber, bi-directional, line-switched, self-healing Synchronous Optical Network (SONET) rings that transport ATM cells. The core ATM network 112 is a Wide Area Network (WAN) that is comprised of four-fiber, bi-directional, line-switched, self-healing SONET rings that transport ATM cells. An example of an ATM switch for the core ATM network 112 is the NEC model 20. Metropolitan ATM networks and core ATM networks are known in the art. The service nodes are network sites that contain ATM switches and network operations equipment. The PSTN 150 represents the well known local and long distance telephone networks, such as Sprint and Bell Atlantic. The Internet 160 is the well known public network based on the Internet Protocol (IP). The Internet 160 could include an Internet Service Provider (ISP), such as SprintLink. The frame relay network 170 is a data network based on the well known frame relay protocol.

In operation, the business 101 exchanges ATM cells containing voice and data with the service node 120 over the metropolitan ATM network 110. The service node 120 exchanges the ATM cells with the other businesses 102–104 over the metropolitan ATM networks 110–111 and the core ATM network 112. The service node 120 exchanges the voice and data traffic in the ATM cells with the PSTN 150, the Internet 160, and the frame relay network 170. The businesses 102–104 exchange ATM cells with the ATM network 100 in a similar manner.

Figure 2:
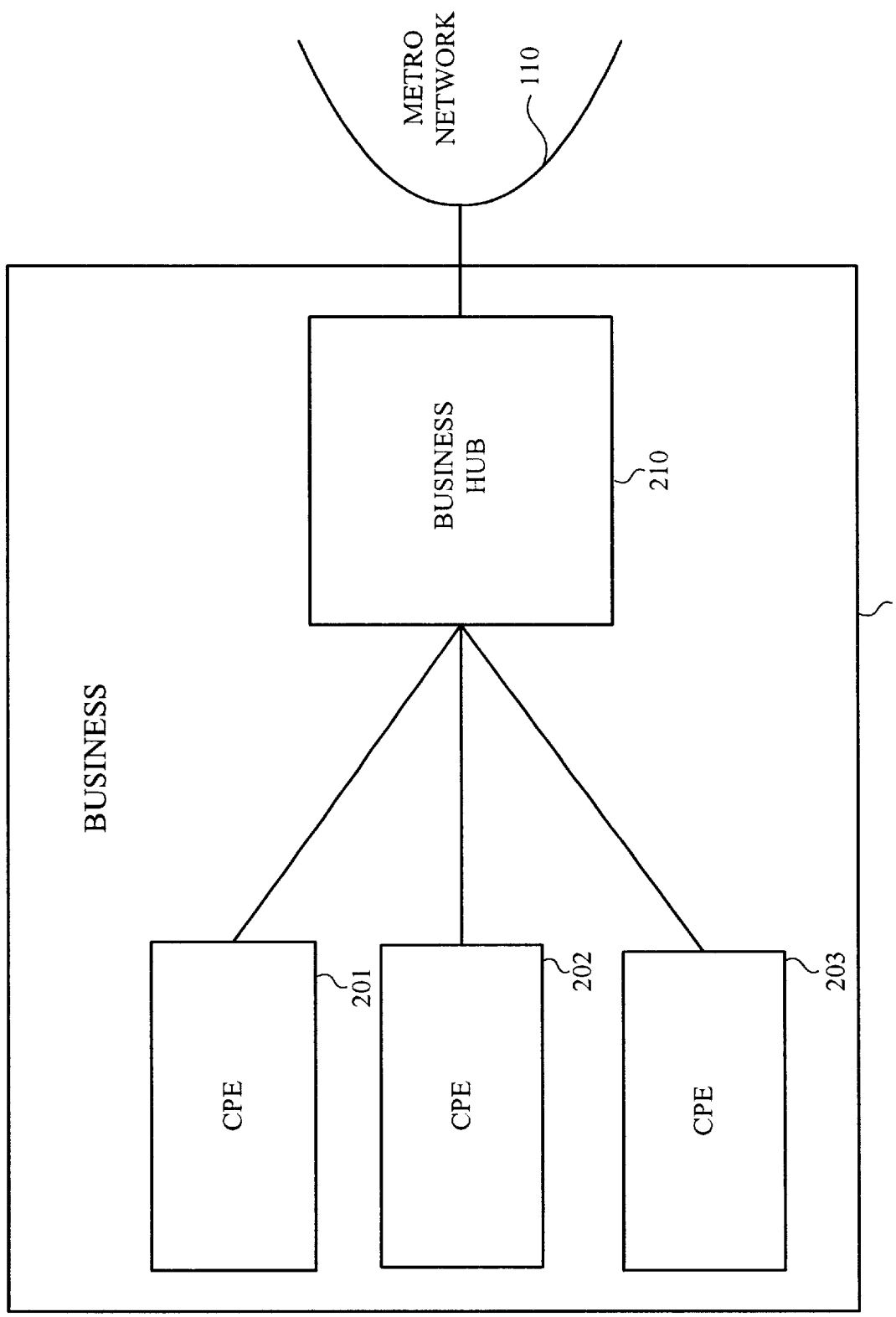
FIG. 2 is a block diagram of a business in some embodiments of the invention.
Figure 3:
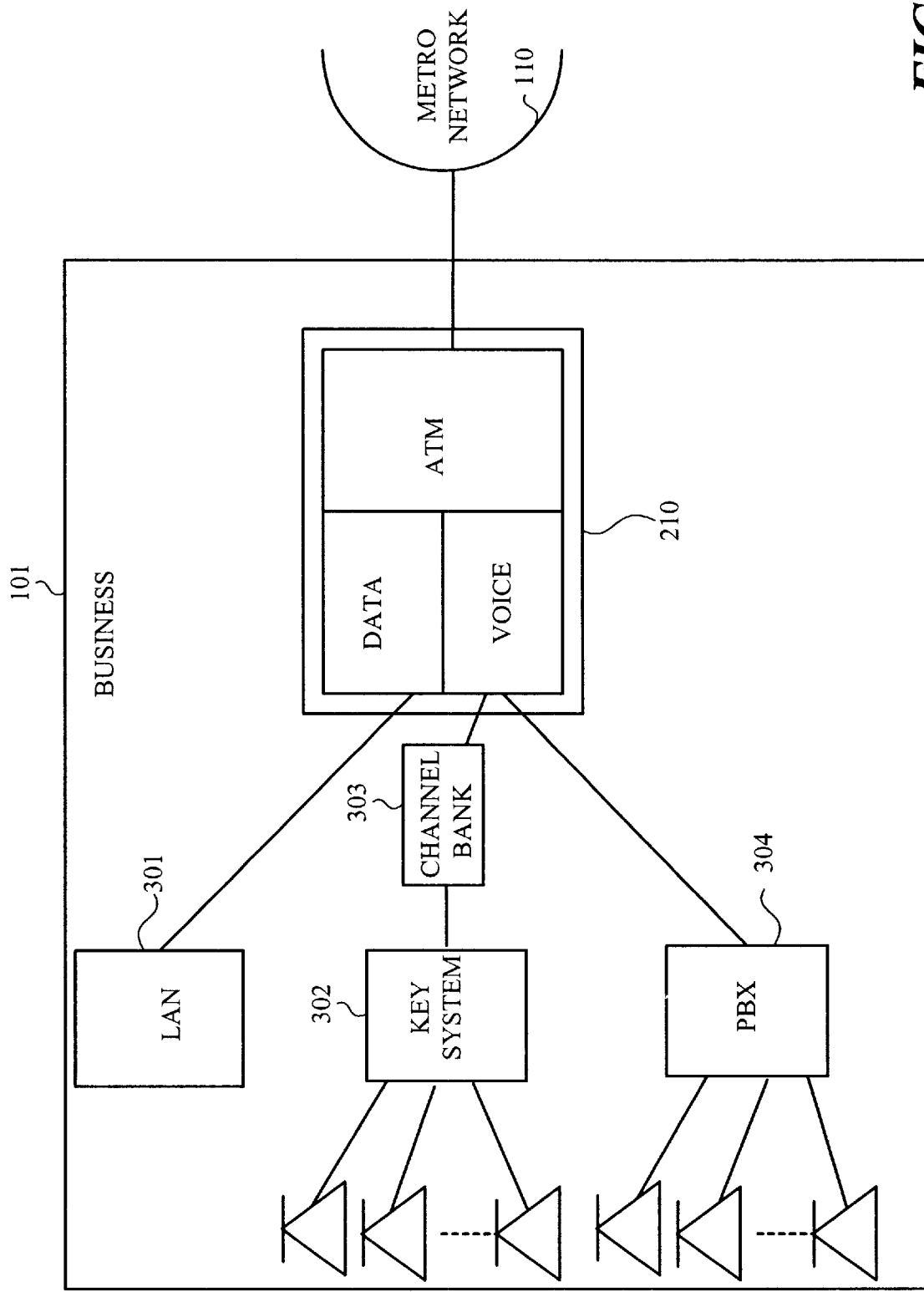
FIG. 3 is a block diagram of a business in some embodiments of the invention.
Figure 4:
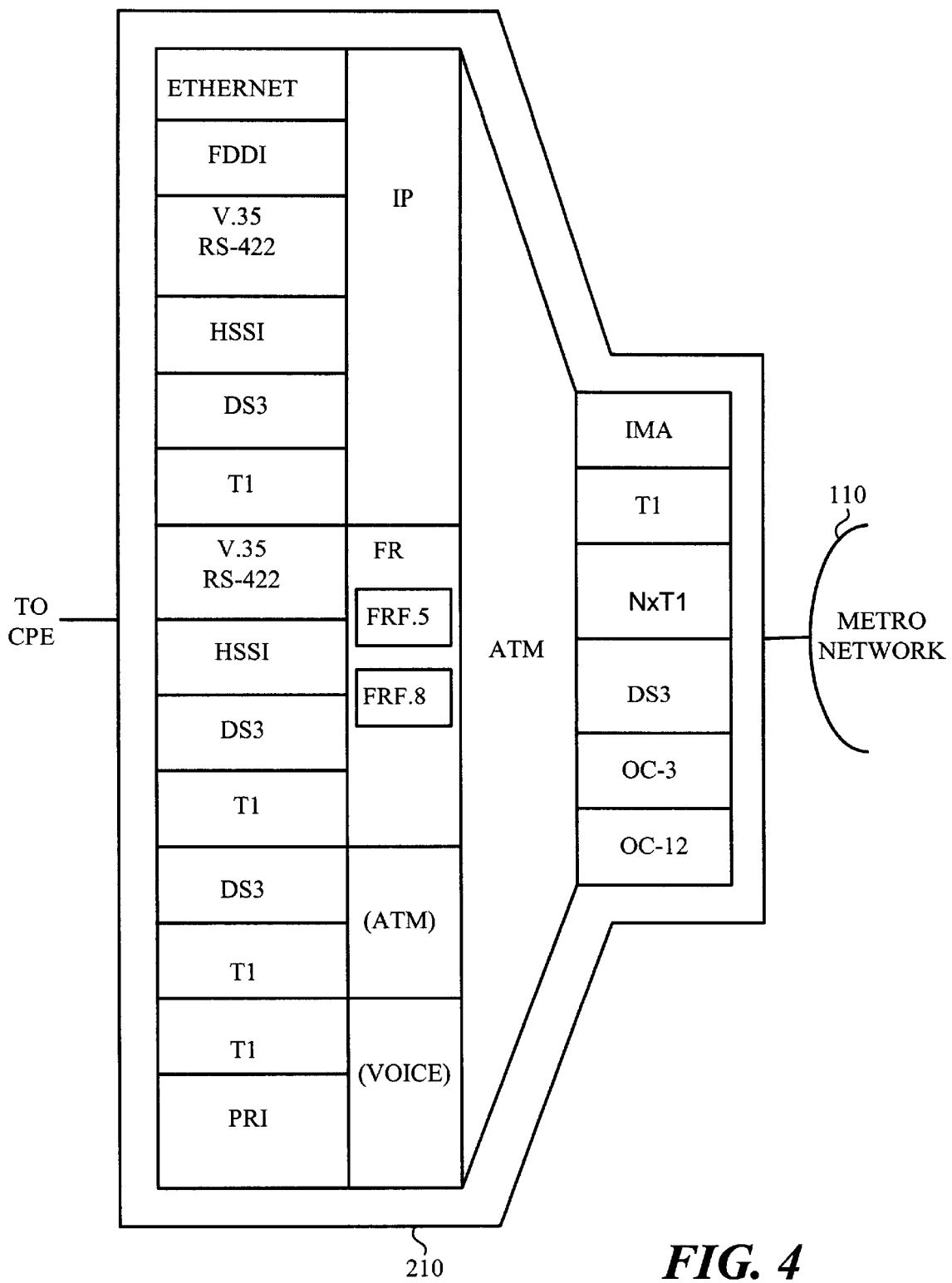
FIG. 4 is a block diagram of a business hub in some embodiments of the invention.

Business Systems—FIGS. 2–4

FIG. 2 depicts the business 101 for some embodiments of the invention. The business 101 is connected to the metropolitan ATM network 110. The business 101 is comprised of Customer Premise Equipment (CPE) 201, 202, and 203 that are connected to a business hub 210. The business hub 210 is connected to the metropolitan ATM network 110. The CPE 201–203 are conventional business communications equipment, such as Local Area Networks (LANs), PBX devices, key systems, telephones, computers, fax machines, and servers. The business hub 210 is a device for exchanging voice and data traffic in various protocols with the CPE 201–203. The business hub 210 interworks these various protocols with the ATM protocol and exchanges the resulting ATM cells with the service node 120 (not shown) over the metropolitan ATM network 110 using PVCs. As a result, the business hub 210 handles all of the communications of the business 101 over a single ATM interface. The business hub 210 could be adapted from the FORE Systems ASX-1000.

FIG. 3 depicts the CPE of the business 101 for some embodiments of the invention, but the invention is not restricted to this particular configuration. The business CPE is comprised of a LAN 301, a key system 302, a channel bank 303, a PBX 304, and the business hub 210. Telephones are shown connected to the key system 301 and the PBX 304, but fax machines, computers, and other devices could also be connected. The LAN 301 is connected to the data interface of the business hub 210. The key system 302 is connected to the channel bank 303, and the channel bank 303 is connected to the voice interface of the business hub 210. The PBX 304 is connected to the voice interface of the business hub 210. The voice and data interfaces of the business hub 210 are coupled to an ATM interface. The ATM interface exchanges the resulting ATM cells with the service node 120 (not shown) over the metropolitan ATM network 110 using PVCs.

The LAN 301 is a short distance communications network that is typically used to link computers and peripheral devices in a building or campus. The LAN 301 would use a physical layer protocol and a data layer protocol to transmit data. Some examples of physical layer protocols and data layer protocols are listed and described below:

Ethernet—an IEEE standard 10 or 100 megabit/second LAN using copper wire or co-axial cable.

Fiber Distributed Data Interface (FDDI)—an ANSI standard 100 megabit/second fiber optic LAN using a counter-rotating token ring topology.

T1/V.35/RS-422—a high speed interface for copper wiring. T1 is a digital link operating at the Digital Service level one (DS1) speed of 1.544 megabits per second. V.35 is an ITU standard interface between a packet network and a network access device. RS-422 is a standard describing the electrical characteristics for a balanced electrical implementation of a high-speed data transmission circuit.

High Speed Serial Interface (HSSI)—a serial data communications interface optimized for speeds up to 52 megabits/second.

Digital Service Level 3 (DS3)—28 T1 channels operating at 44.736 megabits/second.

T1—a digital link operating at the Digital Service level one (DS1) speed of 1.544 megabits per second.

Asynchronous Transfer Mode (ATM)—a switching technology using 53 byte cells that transport voice and data.

Internet Protocol (IP)—a message routing protocol. Used by the "Internet."

Frame Relay (FR)—a switching technology for variable length packets.

Inverse Multiplex ATM (IMA)—an inverse multiplexed ATM connection.

OC-3 and OC-12—SONET signals operating at 155 and 622 megabits/second respectively.

The LAN 301 may include an internal router that supports internal data traffic for the business, such as an intranet. The internal router is typically connected through a firewall to a web server and the web server is connected to the Internet 160. In some embodiments of the invention, internal data traffic is exchanged between the internal router on the LAN 301 and the business hub 210, and Internet traffic is exchanged between the web server on the LAN 301 and the business hub 210. The internal data traffic is provided to the other business sites over ATM PVCs. The Internet traffic is provided to the Internet 160 over another ATM PVC.

The key system 302 is a device that supports multiple telephones. Typically, telephones that are connected to a key system have buttons for selecting internal or external lines. The channel bank 303 is a multiplexer that connects multiple analog voice lines from the key system 302 over a higher speed digital link to the business hub 210. The PBX 304 is a private branch exchange that supports multiple telephones. The PBX 304 can interconnect one telephone at the business with another telephone at the business. The PBX 304 can also connect these telephones to the business hub 210.

FIG. 4 depicts the business hub 210 for some embodiments of the invention. The business hub 210 is shown with numerous interfaces, but all of the interfaces are not required. Various combinations and sub-combinations of the interfaces could be used to access the ATM interface. The Internet Protocol (IP) interface can be coupled to any of the following physical layer interfaces: ethernet, FDDI, V.35/RS-422, HSSI, DS3, and T1. The Frame Relay (FR) interface can be coupled to any of the following physical layer interfaces: V.35/RS-422, HSSI, DS3, and T1. The ATM interface can be coupled to DS3 and T1 physical layer interfaces. The ATM interface includes the voice interface, and the voice interface can be coupled to a T1 physical layer interface and an Integrated Services Digital Network (ISDN) Primary Rate Interface (PRI). The business CPE are connected to the physical interfaces and exchange IP, FR, ATM, and voice with the business hub 210. The IP interface and the FR interface are coupled to the ATM interface. The ATM interface is coupled to one of the physical interfaces to the metropolitan ATM network 110. The possible physical interfaces to the metropolitan ATM network 110 include: IMA, T1, NxT1, DS3, OC-3, and OC-12. In operation, CPE at the business exchange voice and data through one of the physical layer ports to the IP, FR, or ATM interface. The IP and FR interface exchange the data with the ATM interface. The FR interface uses FRF.5 and FRF.8 for ATM interworking. The ATM interface exchanges the data with the service node through one of the physical interfaces to the metropolitan ATM network 110.

Figure 5:
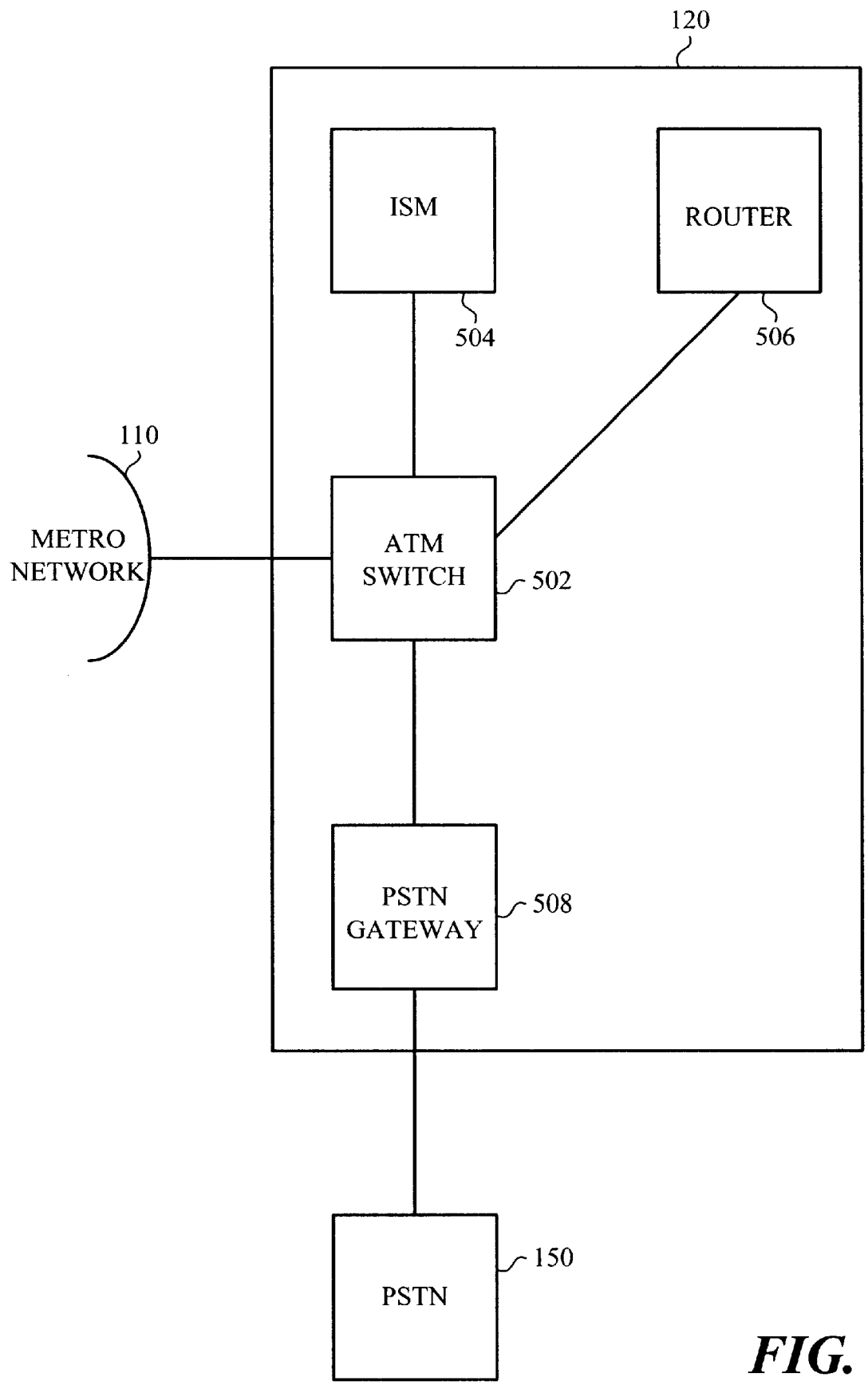
FIG. 5 is a block diagram of a service node in Phase I for some embodiments of the invention.
Figure 6:
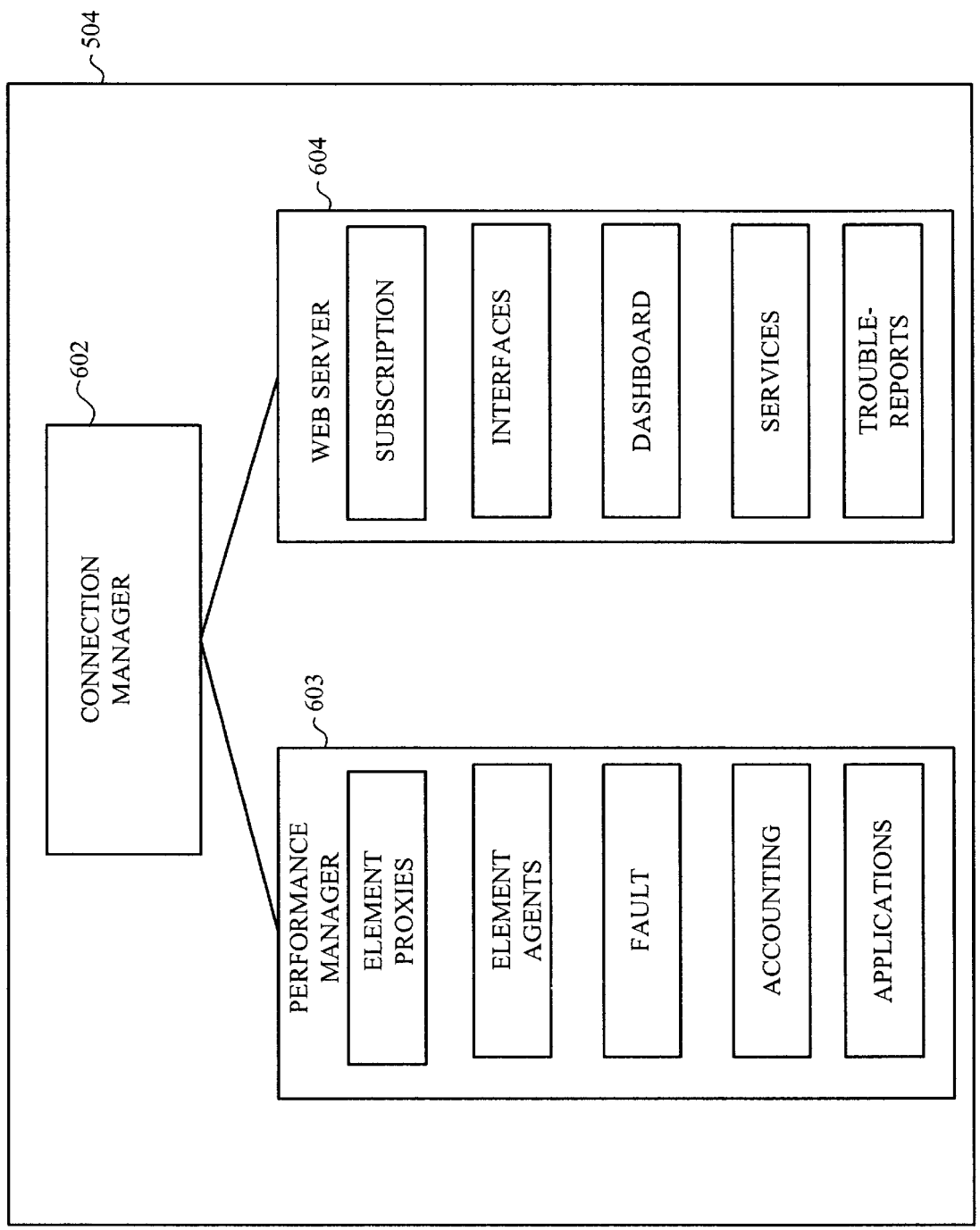
FIG. 6 is a block diagram of an Integrated Service Manager (ISM) server in some embodiments of the invention.
Figure 7:
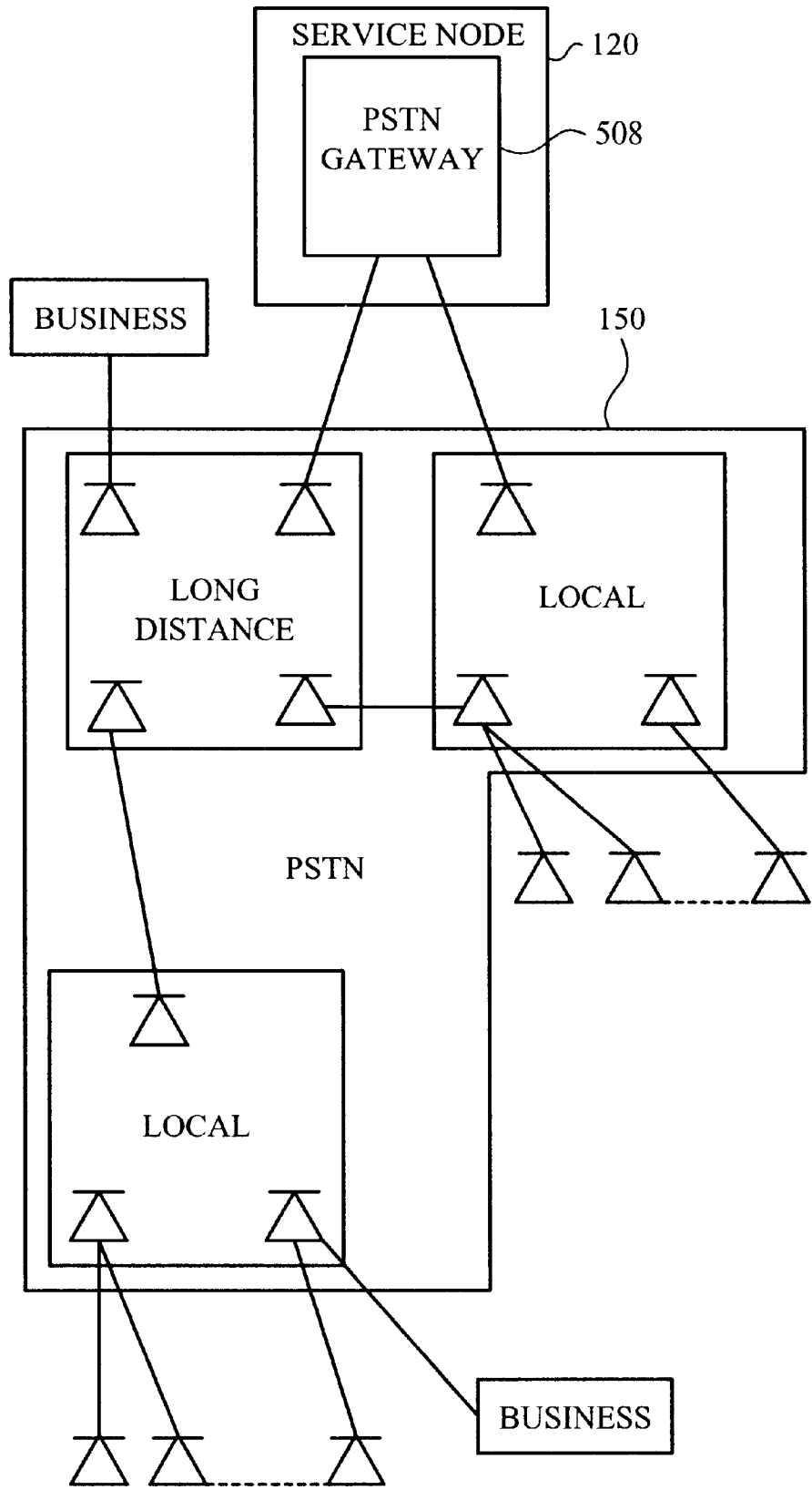
FIG. 7 is a block diagram of a service node, businesses, and the Public Switched Telephone Network (PSTN) in some embodiments of the invention.

Phase I Service Node—FIGS. 5–7

FIG. 5 depicts the service node 120 for some embodiments of the invention. The service node 120 is connected to the metropolitan ATM network 110 and the PSTN 150. The service node 120 is comprised of an ATM switch 502, an Integrated Services Management (ISM) server 504, a router 506, and a PSTN gateway 508.

The ATM switch 502 has a processor, power supply, and interface redundancy. The ATM switch 502 supports the User to Network Interface (UNI) 3.1 defined for service classes CBR,VBR, and UBR. The ATM switch 502 uses traffic management features such as weighted fair queuing and early packet discard to prioritize flows, protect voice from cell delay variation, and protect data from cell loss. One example of the ATM switch 502 is the Nortel Vector.

The ATM switch 502 routes Permanent Virtual Circuits (PVCs) from the business hub 210 to various points. PVCs are established from the business hub 101 to the business hub 102, the PSTN gateway 508, and the core ATM network 112. The core ATM network extends some of the PVCs to the other service node 121, the internet 160, and the frame relay network 170. An ATM switch in the other service node 121 extends some of the PVCs to other businesses 103–104 or the PSTN 150.

The router 506 exchanges IP traffic with the businesses 101–102 over PVCs. The router 506 combines the IP traffic from the various businesses and exchanges the combined IP traffic with the Internet 160 over an ATM PVC using the Unidentified Bit Rate (UBR) standard. The bearer interface should support UNI 3.0 and 3.1. The ATM PVC is carried within a SONET OC-3 or OC-12 connection to a router at an ISP. The router 506 also provides a WWW cache.

FIG. 6 shows depicts ISM server 504 for some embodiments of the invention. The ISM server 504 provides network management capability for service assurance and service delivery. The ISM server 504 manages the ATM switch 502 through provisioning, fault control, and accounting. The ISM server 502 also provides a user interface for subscription, operations, and services. The ISM server 504 provisions, manages, operates, and maintains the network. The ISM server 504 creates the IP infrastructure and the ATM infrastructure. The ISM server 504 adds and removes customer sites from the service node data base. The ISM server 504 provisions PVCs between endpoints of the ATM network, and manages fault conditions. The ISM server 504 has user interfaces for web-browsers, Java, and ethernet; and has network interfaces for ethernet, SNMP, CMIP, and TL-1.

The ISM server 504 is comprised of a connection manager 602, a performance manager 603, and a web server 604. The connection manager 602 tracks the status of network elements and connections and allocates the network elements and connections in response to user service requirements. The connection manager directs the performance manager 603 to control the various network elements. The performance manager 603 includes various software components. Element proxies configure ports, links, crossconnects, and routing tables in the network elements as required by the connection manager 602. Element agents interface with the network elements for other operations, such as fault, configuration, accounting, and security management activities that are required by the connection manager 602. A fault component receives the fault information from the element proxies and the element agents and correlates this information into a common record for the connection manager 602. An accounting component collects accounting and performance information from the element proxies and agents and provides the information to the fault component, billing, and other systems through an event forwarding discriminator. Various applications are also included in performance manager 603, such as an object-oriented database, a Distributed Processing Environment (DPE) trader service based on the Common Object Request Broker Architecture (CORBA), a CORBA-based notification service that guarantees delivery of system events, and a CORBA-based peer recovery service.

The web server 604 includes various software components. A subscription component allows the customer to view the subscribed services and customer information. An interface component allows the customer to view a graphical depiction of the network and network elements involved in the subscribed services to indicate network element performance. A dashboard component allows easy customer access to frequently used services. For example, the dashboard may contain a telephone manager to access caller ID information, phone logs, and missed call information. A service component will provide customer access to applications, such as video-conferencing, virtual private networks, and collaboration environments. A troublereport component allows the customer to report and check the status of trouble tickets, and allows the network administrators to update status.

FIG. 6 depicts the PSTN gateway 508 in the Service Node 120 and the PSTN 150 for some embodiments of the invention. The PSTN gateway 508 provides TDM to ATM interworking between the ATM network 100 and the PSTN 150. In phase I, the PSTN gateway 508 interworks ATM to TDM for ATM adaption layer 1 circuit emulation of T1 connections. The PSTN gateway also supports echo cancellation, fault tolerant hardware, NEBS compliance, and SNMP management.

The PSTN 150 is comprised of local and long distance networks that are comprised of telephone switches. The long distance network is comprised of class 4 switches and may be connected to a business over a dedicated line such as a T1. The local network includes both class switches that connect to the telephones and class 4 tandem switches that connect to the long distance network. Class 5 switches may be directly connected to the long distance network as well. The local network may also be connected to a business over a dedicated line, such as a PRI.

The PSTN gateway 508 is connected to switches in both the local and the long distance networks. The business CPE business separates the local telephone traffic and long distance 1t telephone traffic into separate T1 or PRI connections to the business hub 210. The business hub 210 places the local traffic in an ATM PVC to the PSTN gateway 508 and places the long distance traffic into a separate ATM PVC to the PSTN gateway 508. The PSTN gateway 508 a converts the local traffic from ATM to TDM and connects the local traffic to the local network in the PSTN 150. The PSTN gateway 508 converts the long distance traffic from ATM to TDM and connects the long distance traffic to the long distance network in the PSTN 150. The long distance network typically connects the call to another local network in the PSTN 150 for connection to a telephone.

Phase I Traffic Flows—FIGS. 1–7

There are several traffic flows through the ATM network 100 for the businesses 101–104. Traffic is referred to as on-net and off-net. On-net to on-net traffic originates and terminates at a hub of the ATM network 100. Traffic originating and terminating at the businesses 101–104 is on-net to on-net. On-net to off-net traffic originates at a hub of the network 100, but terminates elsewhere, such as through the PSTN 150. Off-net to on-net traffic terminates at hub of the network 100, but originates elsewhere, such as the Internet 160. Traffic may be either dedicated or switched. Dedicated traffic flows between two pre-determined points. The endpoints for switched traffic are defined at the time of the communication and a network sets-up the connection.

Dedicated voice traffic can flow between any of the businesses 101–104 as might occur for a large corporation with multiple regional offices that are connected by private lines. The ATM network 100 transports voice traffic over PVCs between the businesses 101–104. The PVC between the business 101 to the business 102 is established: 1) from the business hub 210 in the business 101 through the metropolitan ATM network 110 to the ATM switch 502 in the service node 120, and 2) from the ATM switch 502 in the service node 120 through the metropolitan ATM network 110 to the business hub in the business 102. The PVCs between the business 101 and the businesses 103–104 are established: 1) from the business hub 210 in the business 101 through the metropolitan ATM network 110 to the ATM switch 502 in the service node 120, 2) from the ATM switch 502 in the service node 120 through the metropolitan ATM network 110, the core ATM network 120, and the metropolitan ATM network 111 to the ATM switch in the service node 121, and 3) from the ATM switch in the service node 121 through the metropolitan ATM network 111 to the business hubs in the businesses 103–104. The other businesses 102–104 could be connected in a similar manner.

Switched voice traffic can flow between any of the businesses 101–104. The ATM network 100 transports the voice traffic over PVCs between the businesses 101–104 and the PSTN 150. The PSTN 150 transports the voice traffic over conventional switched connections between the service node 120 and the service node 121. The PVCs between the businesses 101–104 and the PSTN 150 are established: 1) from the business hubs in the businesses 101–102 through the metropolitan ATM network 110 to the ATM switch 502 in the service node 120, 2) from the ATM switch 502 in the service node 120 to the PSTN gateway 508 in the service node 120, 3) from the business hubs in the businesses 103–104 through the metropolitan ATM network 111 to the ATM switch in the service node 121, and 4) from the ATM switch in the service node 121 to the PSTN gateway in the service node 121. The PSTN gateways in the service nodes 120–121 connect to the PSTN 150 using conventional Time Division Multiplexing (TDM) connections and associated Signaling System #7 (SS7) links. In some embodiments, local and/or long distance networks of the PSTN 150 are integrated with the ATM network 100 into a single communications network.

Dedicated voice traffic can flow between any hub and any off-net location. The ATM network 100 transports the voice traffic over a PVC between the business 101 and the PSTN 150. The PSTN 150 transports the voice traffic and over a conventional dedicated connection between the service node 120 and the off-net location. The PVC between the business 101 and the PSTN 150 is established: 1) from the business hub 210 in the business 101 through the metropolitan ATM network 110 to the ATM switch 502 in the service node 120, and 2) from the ATM switch 502 in the service node 120 to the PSTN gateway 508 in the service node 120. The PSTN gateway 508 is connected to the PSTN 150 over a dedicated TDM link, such as a T1. In some embodiments, local and/or long distance networks of the PSTN 150 are integrated with the ATM network 100 into a single communications network. The other businesses 102–104 could be connected in a similar manner.

Switched voice traffic can flow between any hub and any off-net location. The ATM IS network 100 transports the voice traffic over a PVC between the business 101 and the PSTN 150. The PSTN 150 transports the voice traffic over a conventional switched connection between the service node 120 and the off-net location. The PVC between the business 101 and the PSTN 150 is established: 1) from the business hub 210 in the business 101 through the metropolitan ATM network 110 to the ATM switch 502 in the service node 120, and 2) from the ATM switch 502 in the service node 120 to the PSTN gateway 508 in the service node 120. The PSTN 508 gateway in the service node 120 connects to the PSTN 150 using conventional Time Division Multiplexing (TDM) connections and associated Signaling System #7 (SS7) links. In some embodiments, local and/or long distance networks of the PSTN 150 are integrated with the ATM network 100 into a single communications network. The other businesses 102–104 could be connected in a similar manner.

Data traffic can flow between any of the businesses 101–104. The ATM network 100 transports the data traffic over PVCs between the businesses 101–104. The PVC between the business 101 to the business 102 is established: 1) from the business hub 210 in the business 101 through the metropolitan ATM network 110 to the ATM switch 502 in the service node 120, and 2) from the ATM switch 502 in the service node 120 through the metropolitan ATM network 110 to the business hub in the business 102. The PVCs between the business 101 and the businesses 103–104 are established: 1) from the business hub 210 in the business 101 through the metropolitan ATM network 110 to the ATM switch 502 in the service node 120, 2) from the ATM switch 502 in the service node 120 through the metropolitan ATM network 110, the core ATM network 120, and the metropolitan ATM network 111 to the ATM switch in the service node 121, and 3) from the ATM switch in the service node 121 through the metropolitan ATM network 111 to the business hubs in the businesses 103–104. The other businesses 102–104 could be connected in a similar manner.

Internet data traffic can flow between any of the businesses 101–104. The ATM network 100 transports the data traffic over PVCs between the businesses 101–104 and the Internet 160. The Internet 160 transports the data traffic over conventional IP connections between the service node 120 and the service node 121. The PVCs between the businesses 101–104 and the Internet 160 are established: 1) from the business hubs in the businesses 101–102 through the metropolitan ATM network 110 to the ATM switch 502 in the service node 120, 2) from the ATM switch 502 in the service node 120 to the router 506 in the service node 120, 3) from the router 506 in the service node 120 through the metropolitan ATM network 110 and the core ATM network 112 to the Internet 160, 4) from the business hubs in the businesses 103–104 through the metropolitan ATM network 111 to the ATM switch in the service node 121, 5) from the ATM switch in the service node 121 to the router in the service node 121, and 6) from the router in the service node 121 through the metropolitan ATM network 111 and the core ATM network 112 to the Internet 160. In some embodiments, an Internet Service Provider (ISP) of the Internet 160 is integrated with the ATM network 100 into a single communications network.

Data traffic can flow between any hub and any off-net location. The ATM network 100 transports the data traffic over a PVC between the business 101 and the PSTN 150, the Internet 160, or the frame relay network 170. The PSTN 150, the Internet 160, and the frame relay network 170 transport the data traffic and over conventional data connections to the off-net location. The PVC between the business 101 and the PSTN 150 is established: 1) from the business hub 210 in the business 101 through the metropolitan ATM network 110 to the ATM switch 502 in the service node 120, and 2) from the ATM switch 502 in the service node 120 to the PSTN gateway 508 in the service node 120. The PSTN gateway 508 is connected to the PSTN 150 over a dedicated TDM link, such as a T1. The PVC between the business 101 and the Internet 160 is established: 1) from the business hub 210 in the business 101 through the metropolitan ATM network 110 to the ATM switch 502 in the service node 120, 2) from the ATM switch 502 in the service node 120 to the router 506 in the service node 120, and 3) from the router 506 in the service node 120 through the metropolitan ATM network 110 and the core ATM network 112 to the Internet 160. The PVC between the business 101 and the frame relay network 170 is established: 1) from the business hub 210 in the business 101 through the metropolitan ATM network 110 to the ATM switch 502 in the service node 120, 2) from the ATM switch 502 in the service node 120 through the metropolitan ATM network 110 and the core ATM network 112 to the Internet 160. In some embodiments, a local network, long distance network, ISP, and/or frame relay network is integrated with the ATM network 100 into a single communications network.

From the above-described architecture and traffic flows it can be seen that a typical large business with T1 or greater traffic would interconnect its various sites by ATM PVCs that carry both voice and data between those sites. A typical business site would also be connected by a PVCs to a local telephone network, a long distance telephone network, a frame relay network, and the Internet. All of the PVCs are bundled together into a single ATM connection from the business to the service node in the ATM network. The ATM connection integrates the various communications needs of the business.

Figure 8:
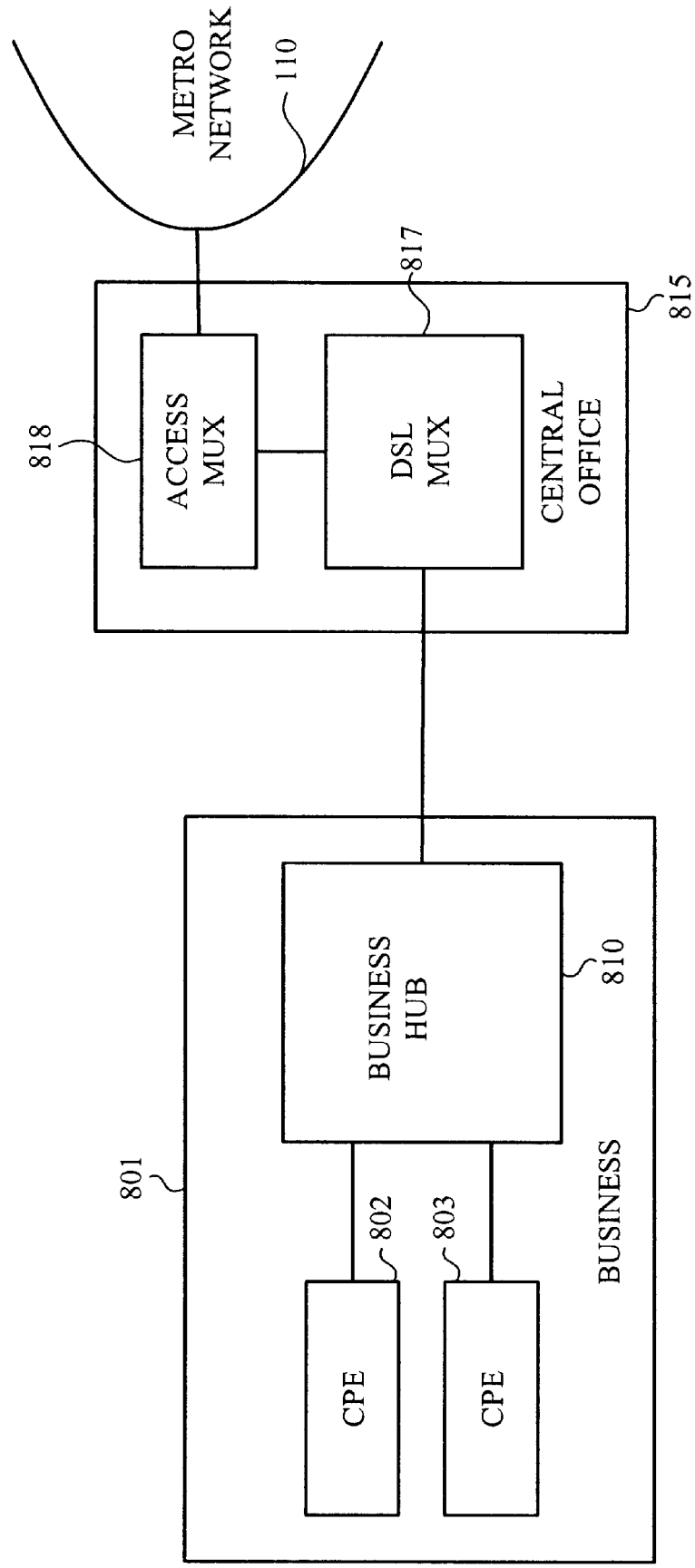
FIG. 8 is a block diagram of a Phase II addition to the Phase I architecture in some embodiments of the invention.
Figure 9:
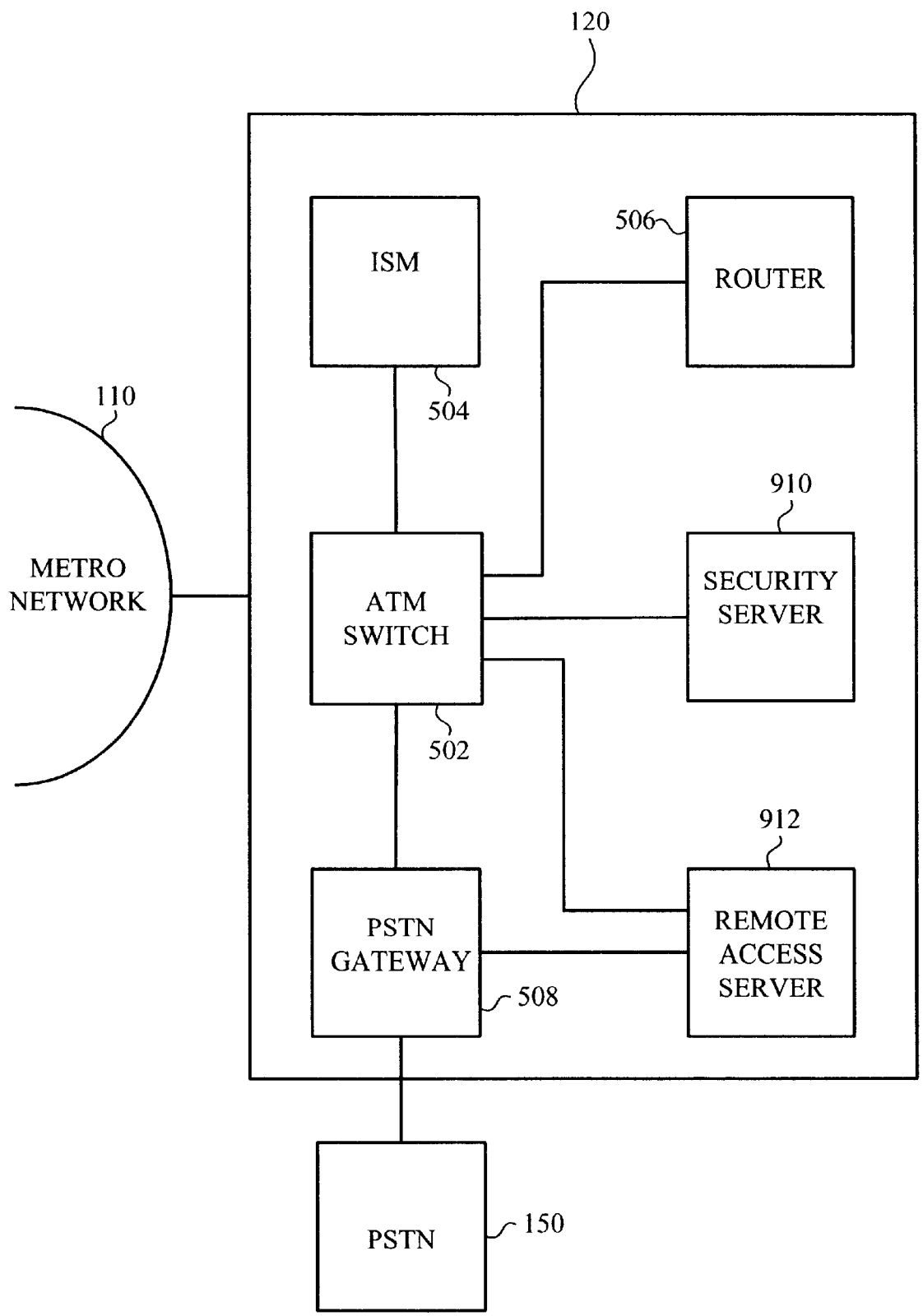
FIG. 9 is a block diagram of a service node in Phase II for some embodiments of the invention.

Phase II Architecture, Service Node, and Traffic Flows—
FIGS. 8–9

FIG. 8 depicts a Phase II addition to the Phase I architecture. A business 801 is connected to a central office 815, and the central office 815 is connected to the metropolitan ATM network 110. The business 801 is similar to the businesses 101–104, but it is typically smaller. The business 801 includes the CPE 802-803 and the business hub 810. The CPE 802-803 include telephones, computers, fax machines, LANs and other communications equipment typically found in a business. The business hub 801 is similar to the business hub 210 except that the business hub 810 is equipped with an xDSL/ATM interface for an xDSL/ATM connection between the business hub 810 and the DSL multiplexer 817 in the central office 815. The business hub 810 exchanges ATM cells that contain voice and data with the DSL multiplexer 817 over the xDSL connection.

The central office 815 is the well known central office in current local telephone networks. The central office 815 includes a Digital Subscriber Line (DSL) multiplexer 817 and an ATM access multiplexer 818, in addition to numerous other components that are well known in the art, but that are omitted for the purpose of clarity. The DSL multiplexer 817 accepts xDSL/ATM signals from multiple business sites and multiplexes these signals onto a SONET/ATM OC-3 connection to the ATM access multiplexer 818. One example of the DSL multiplexer 817 is the DSL product provided by Westell. The DSL multiplexer 817 should include redundant OC-3 network interfaces and handle up to 255 telephony connections on the access side and be able to differentiate data from voice. The ATM access multiplexer 818 accepts the SONET/ATM connection from the DSL multiplexer 817 and extends the SONET/ATM connection to the service node 120 over the metropolitan ATM network 110. The ATM access multiplexer supports Quality-of-Service (QoS) differentiation between voice and data and is includes extensive traffic management features to protect the voice traffic.

FIG. 9 depicts a Phase II addition to the service node 120 of Phase I. The metropolitan ATM network 110, service node 120, and PSTN 150 are shown on FIG. 9. The service node 120 includes the ATM switch 502, the ISM 504, the router 506, and the PSTM gateway 508. The service node 120 also includes a security server 910 and a remote access server 912. The remote access server 912 allows dial-up access to CPE in the businesses 801 and 101–104 through the service node 120. The remote access server supports access by Macintosh, Windows, DOS, or Unix workstations at 56 kilobits/second. The security server provides authentication, authorization, and accounting support to the businesses for mobile users.

The traffic flows for the business 801 are the same as those described for the business 101 except that the business hub 810 in the business 801 is connected to the service node 120 through the DSL multiplexer 817 and ATM access multiplexer 818 in the central office 815 and through the metropolitan ATM network 110. Traffic flowing between the business 801 and the service node 120 takes this route. The business 801 has ATM PVCs through the service node 120 that are similar to those described above for the business 101, except that the PVCs for the business 801 flow through the central office 815. These PVCs typically include PVCs for local telephone traffic, long distance telephone traffic, Internet traffic, dedicated voice traffic, and dedicated data traffic. For example, the PVCs for the local and long distance telephone traffic extend: 1) from the business hub 810 over the DSL connection to the DSL multiplexer 815 and ATM access multiplexer 818 in the central office 815, 2) from the ATM access multiplexer 818 through the metropolitan ATM network 110 to the ATM switch 502 in the service node 120, and 3) from the ATM switch 502 to the PSTN gateway 508 in the service node 120. The PSTN gateway 508 interworks the ATM and TDM connections and connects to the local and long distance networks using the conventional TDM connections and SS7 links.

Remote Access—FIGS. 1, 8, and 9

Phase II offers remote data access between a remote user and a business, such as the business 101. The remote user connects to the remote access server 912 in the service node 120 using a modem connection through the PSTN 150. The remote access server 912 uses a secure IP tunnel to the router 506 in the service node 120 using Layer 2 Tunneling Protocol (L2TP) and In Internet Protocol Security (IP SEC). The router 506 will use an ATM PVC to exchange the traffic with the business hub 210 at the business 101. The security server 910 handles authentication using the RADIUS protocol. The remote access server 912 and the router 506 mentioned above do not need to be in the same service node. Typically, the remote user will connect to a nearby remote access server using a local telephone call and a 56 kilobit modem. The remote access server will use a secure IP tunnel to a router in another service node that serves the business. The remote access server is typically near the remote user and the router is typically near the business.

Figure 10:
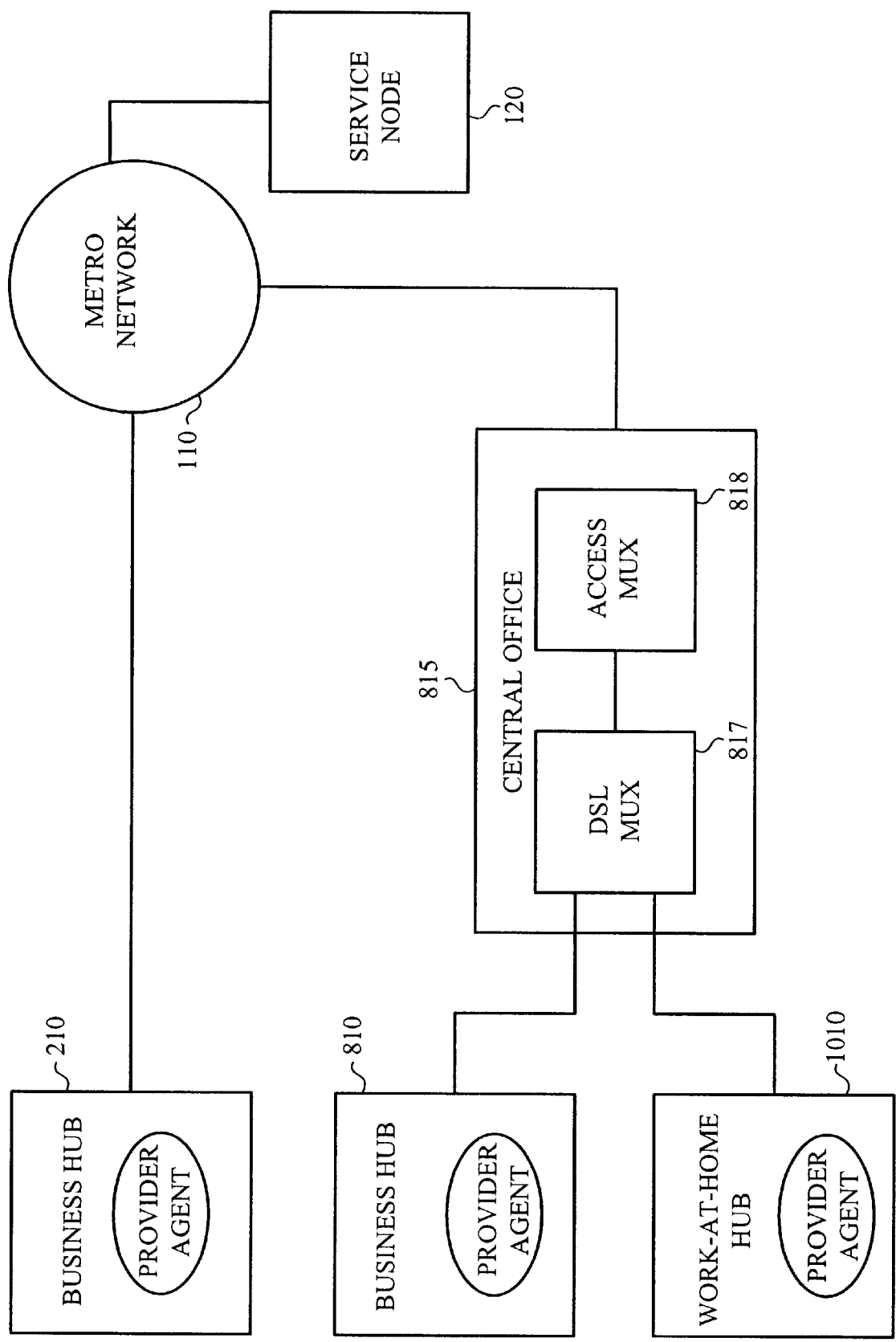
FIG. 10 is a block diagram of a Phase III addition to the Phase II architecture in some embodiments of the invention.
Figure 11:
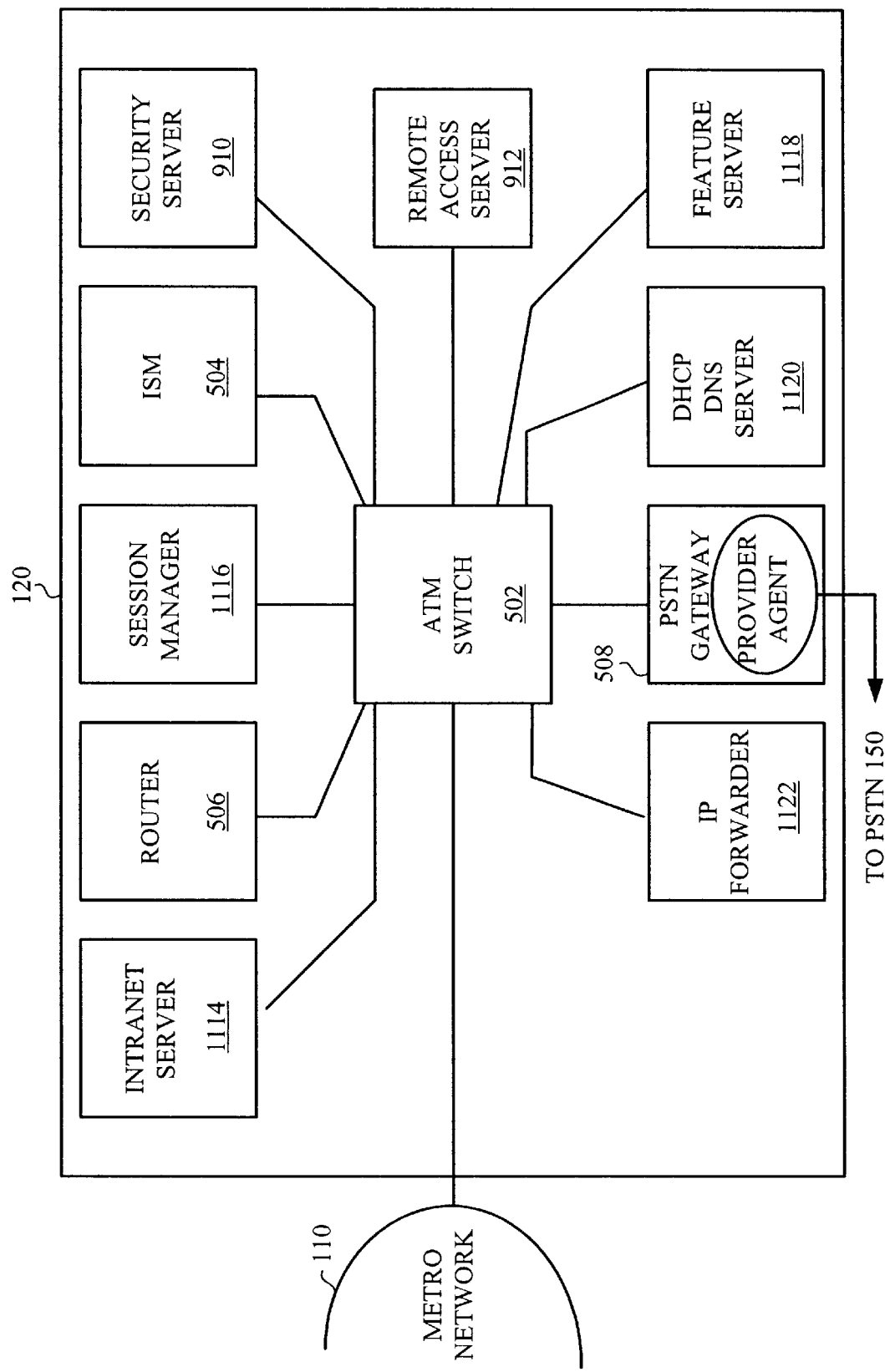
FIG. 11 is a block diagram of a service node in Phase III for some embodiments of the invention.

Phase III Architecture and Service Node—FIGS. 10–11

FIG. 10 depicts the Phase III addition to the Phase II architecture. A Work-At-Home (WAH) hub 1010 is connected to the DSL multiplexer 817 in the central office 815 over an xDSL/ATM connection. The business hub 810 is also connected to the DSL multiplexer 817 by an xDSL/ATM connection. The DSL multiplexer 817 is connected to the ATM access multiplexer 818. The ATM access multiplexer is connected to the service node 120 over the metropolitan ATM network 110. The business hub 210 is connected to the service node 120 over the metropolitan ATM network 110. The WAH hub 1010 provides voice and data communications to the business 101 over ATM connections. The primary function of the WAH hub 1010 is to provide an interface for voice and IP over ATM/xDSL. The business hubs 210 and 810 have been upgraded to include provider agents. Provider agents represent software that is able to interact with a session manager in the service node to establish SVC-based communications paths in response to user requests.

FIG. 11 depicts the Phase III addition to the service node 120 with the ATM switch 502, ISM server 504, router 506, PSTN gateway 508, security server 910, and remote access server 912. An intranet server 1114, session manager 1116, feature server 1118, Dynamic Host Configuration Protocol (DHCP) and Domain Name Service (DNS) server 1120, and IP forwarder 1122 are added and connected to the ATM switch 502. The ATM switch 502 must support Switched Virtual Circuits (SVCs) in Phase III. The intranet server 114 provides intranets for the businesses. The intranet server 114 can be accessed through the various hubs or through a secure modem connection to a remote access server. The feature server 1118 provides various features such as, class 5 switch features, voice mail, call forwarding, call waiting, call transfer, internet web browsers, and software downloading. The feature server 1118 is TINA-C compliant. The DHCP/DNS server 1120 provides auto-configuration of IP-aware devices. It dynamically synchronizes domain name databases and dynamically assigns IP addresses. The IP forwarder 1122 provides IP routing and forwarding for data traffic. The IP forwarder 1122 performs aggregation of IP PVCs from the businesses for the router 506. The IP router 506 supports priority levels and is compliant with ATM forum User to Network Interface (UNI) 3.1 recommendations.

The session manager 1116 controls the set-up and delivery of communications services. The session manager 1116 interacts with the provider agents in the various hubs to establish connections using SVCs in response to user requests. The session manager 1116 is compliant with the Telecommunication Information Network Architecture Consortium (TINA-C). Version 8.0 of the "Retailer Reference Point Specification" issued by TINA-C specifies the session manager 1116, the connections between the session manager 1116 and the provider agents, and the messages exchanged between the session manager 1116 and the provider agents. The interface between the session manager 1116 and the provider agents is defined by the Retailer Reference Point Specification in Object Definition Language (ODL) and is compiled into the Interface Definition Language (IDL) of the Common Object Request Broker Architecture (CORBA) and is transported over ATM using classic IP.

The PSTN gateway 508 is upgraded in Phase III to support the SS7 signaling and session manager 1116 call routing. A version of the provider agent is resident in the PSTN gateway 508 to interface between the session manager 1116 and the PSTN 150. The PSIN gateway 508 is connected to local networks over a TR-395 connection with associated SS7 signaling links. The PSTN gateway 508 is connected to long distance networks over a TR-317 connection with associated SS7 signaling links. The PSTN gateway 508 interworks the TDM traffic from the PSTN 150 with the ATM traffic from ATM switch 502. The PSTN gateway 508 also interworks SS7 ISUP/TCAP signaling and ISDN signaling from the PSTN 150 with ATM signaling from session manager 1116. The PSFN gateway 508 supports intelligent network functions such as 800, LIDB, local number portability, E911, and operator services. The PSTN gateway 508 utilizes AAL1 based DS0 circuit emulation with echo cancellation.

Figure 12:
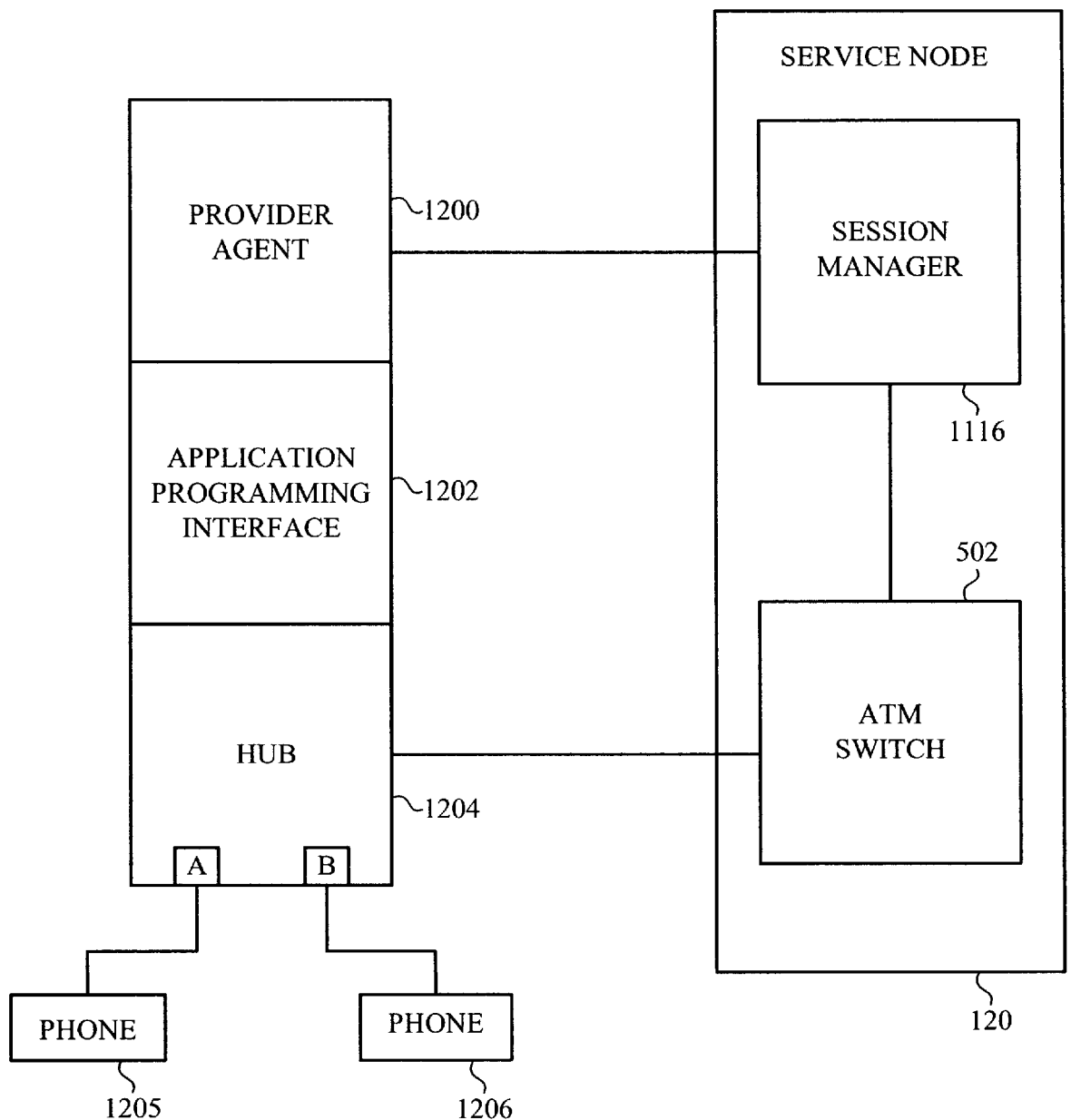
FIG. 12 is a block diagram of a service node and a generic hub including a provider agent for some embodiments of the invention.
Figure 13:
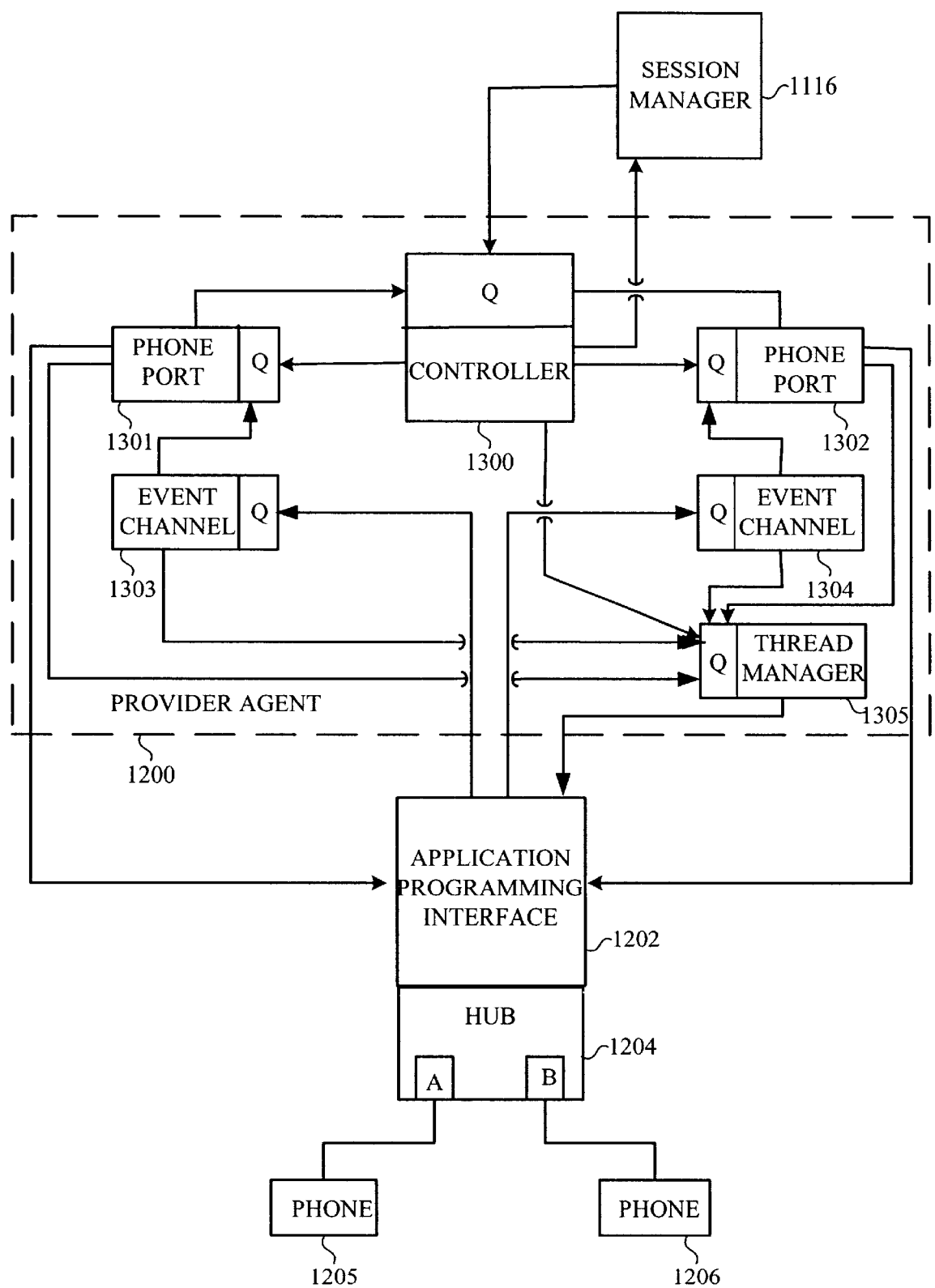
FIG. 13 is a block diagram of a software architecture for a provider agent in some embodiments of the invention.
Figure 14:
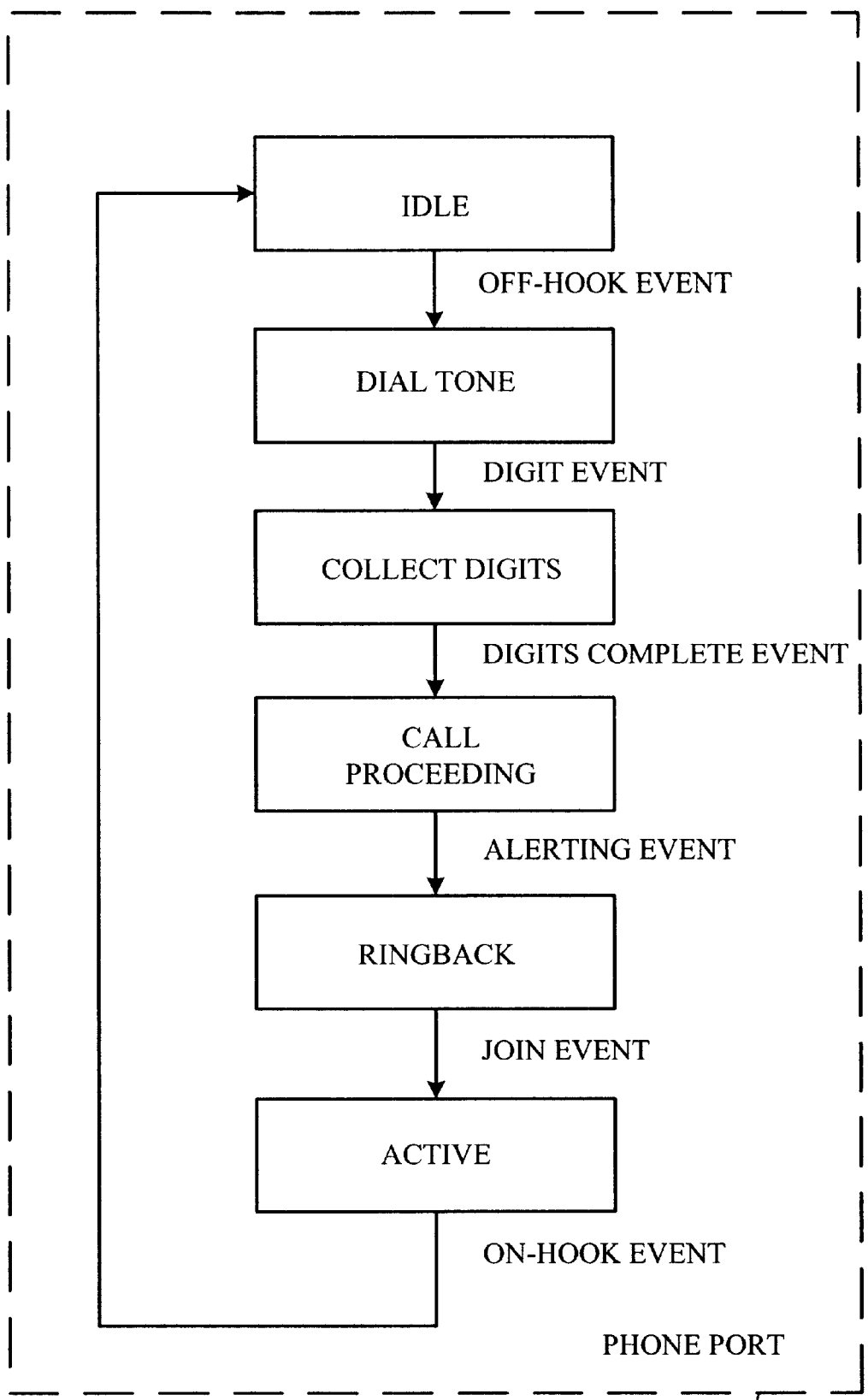
FIG. 14 is a block diagram of a telephone port software object state machine in a provider agent for some embodiments of the invention.

Provider Agents and Hubs—FIGS. 12–14

FIG. 12 depicts a provider agent 1200 that is coupled to an Application Programming Interface (API) 1202. The API 1202 is coupled to a hub 1204. The hub 1204 is connected to phones 1205–1206 over channels A and B respectively. The provider agent 1200 is coupled with the session manager 1116 in the service node 120. The hub 1204 is connected to the ATM switch 502 in the service node 120. There may be equipment coupled in between the hub 1204 and the phones 1205–1206, such as the PBX 304, and there may be equipment coupled in between the hub 1204 and the ATM switch 502, such as the DSL multiplexer 817 and the metropolitan ATM network 111, but the equipment is not depicted on FIG. 12 for the sake of clarity.

The hub 1204 represents a generic version of the business hubs 210 and 810, the WAH hub 1010, the residential hub 1900, the analog hub 1902, or the PSTN gateway 508. In various embodiments of the invention, the hub 1204 interacts with PSTN 150, the PBX 302, or the channel bank 303. In other embodiments of the invention, the hub 1204 interacts directly with the phones 1205–1206. The latter embodiment of the hub 1204 is discussed below, but those skilled in the art will recognize how the teachings could be applied to a provider agent and hub in operational combination with the PSTN 150, the PBX 302, or other similar equipment.

In some embodiments, the channels in the hub 1204 to the phones 1205–1206 are conventional telephone ports. The hub 1204 includes circuitry to interwork analog telephony signals from the phones 1205–1206 with the digital signals to the service node 120. The hub 1204 includes circuitry that generates dial tones, ring-back tones, busy tones, fast-busy tones, and ring current for the phones 1205–1206. The hub 1204 includes circuitry that detects Dual Tone Multi-Frequency (DTMF) digit events, off-hook events, and on-hook events, and that provides messages indicating these events. The hub 1204 includes software control systems that control the circuitry and interface with the API 1202.

The phones 1205–1206 represent any communications devices supported by the hub 1204. Some examples are conventional analog telephones, wireless phones, computers, modems, and fax machines. Additional phones could be connected to channels A and B, or additional phones could be connected to additional channels on the hub 1204. Only two channels with one phone each is shown for the sake of clarity.

The API 1202 is a software interface that exchanges event messages and instructions between the hub 1204 and the provider agent 1200. The provider agent 1200 accepts event messages from the hub 1204 through the API 1202 and provides instructions back to the hub 1204. For example, the provider agent 1200 might receive information through the API 1202 that the phone 1205 has gone off-hook. In response, the provider agent 1200 might provide a control instruction through the API 1202 to the hub 1204 to provide dial tone to the phone 1205. In some embodiments of the invention, the API 1202 is specified in the Information Definition Language (IDL) of the Common Object Request Broker Architecture (CORBA).

The provider agent 1200 responds to event messages for the phones 1205–1206 with instructions for the hub 1204 to interact with the user. User interaction includes dial tone, digit collection, ring, ringback, and busy signals. The provider agent 1200 also exchanges messaging with the session manager 1116. Messages include invite messages, reply messages, join messages, and terminate messages.

Both the provider agent 1200 and the API 1202 are comprised of software that is stored on a software storage medium. Examples of a software storage medium include magnetic disks, optical disks, or integrated circuits. The provider agent 1200 and the API 1202 could also be stored on a server and down-loaded to a user over the Internet 160 or another operational connection. In some embodiments of the invention, the provider agent is comprised of objects written in C++ code.

FIG. 13 depicts one example of a software architecture for the provider agent 1200. The provider agent 1200, the API 1202, the hub 1204, the phones 1205–1206, and session manager 1116 operate as discussed above. The provider agent 1200 is comprised of the following software objects: a controller object 1300, port objects 1301–1302, event objects 1303–1304, and a thread manager object 1305. The port object 1301 and the event object 1303 are associated with channel A. The port object 1302 and the event object 1304 are associated with channel B. The software objects 1300–1305 are executed by a multi-threaded processing system with each object having its own thread. Each object also has a queue that is indicated on FIG. 13 by the letter "Q". The queue is the software component that receives and buffers messages for the object.

The controller object 1300 communicates with the session manager 1116 and the port objects 1301–1302. Communications with the session manager 1116 are comprised of the following messages:

Start Service—a message to the session manager that initially identifies the service requested and includes an access key, a service ID, and user information.

Reference Information—a message from the session manager that includes session ID, party ID, and a secret ID.

Invite—a message that requests a telephony session and includes the dialed number(s).

Reply—a message that responds to an Invite message and indicates alerting, busy, or reject.

Join—a message that indicates that the party is ready to join the session.

Add Stream—a message to the session manager that requests a connection to be established to another party and that includes the terminal ID, the Party ID and the Virtual Path (VP)/Virtual Connection (VC).

Join Stream—a message from the session manager that requests a party to attach to a connection from another party.

Terminate—a message that is sent or received by the provider agent and that indicates that the session is over.

The controller object 1300 encapsulates call related information by generating call record objects that are identified by session ID and channel ID. The controller object 1300 stores data indicating the idle or busy status of each channel. The controller object 1300 includes an internal data structure for any desired call-handling policies. Call handling policies include rules for call waiting, voice mail, call blocking, and the internal routing of incoming calls to particular phones, such as idle phones. These policies can be varied based on the caller's number, the time of day, or other factors.

The port objects 1301–1302 are state machines. FIG. 14 depicts one example of a state machine for the port object 1301 in block diagram form. The initial state is Idle. An off-hook event for channel A moves the port object 1301 to the dial tone state and an instruction to provide dial tone is provided to the hub 1204. A digits event for channel A moves the port object 1301 to the collect digits state and an instruction to stop dial tone is provided to the hub 1204. The port object 1301 creates a digit collection object. Digits that are collected by the hub 1204 are provided to the digit collection object for analysis. The digit collection object determines the type of number dialed, such as emergency numbers, seven-digit numbers, ten-digit numbers, and international numbers. The digit collection object instructs the port object 1301 when digit collection is complete. A digits complete event for channel A moves the port object 1301 to the call proceeding state and the port object 1301 instructs the controller object 1300 to send Start Service and Invite messages to the session manager 1116. An alerting indication from the controller object 1300 moves the port object 1301 to the ringback state where a ringback instruction is provided to the hub 1204. The alerting event is based on a reply message from the session manager 1116. A join event from the controller object 1300 moves the port object 1301 to the active state where the session is conducted. The join event is based on a join message from the session manager 1116. An on-hook event for channel A moves the port object 1301 back to the idle state and results in a termination message being sent by the controller object 1300 to the session manager 1116.

A few deviations from the above-described state machine should be appreciated. If the reply message had a busy indication, a busy state would be entered instead of the ringback state, and a busy tone instruction would be provided to the hub 1204. If the reply message had a reject indication, a fast-busy state would be entered instead of the ringback state and a fast-busy tone instruction would be provided to the hub 1204. In both of the above cases, an on-hook event moves the port object 1301 back to the idle state.

When receiving a call, the state machine is much simpler. In the idle state, an invite indication from the controller object 1300 moves the port object 1301 to the ring state where the hub 1204 is instructed to ring channel A. The invite indication is based on an invite message from the session manager 1116. An off-hook event for channel A moves the port object 1301 to that active state, until an on-hook event moves the port object 1301 back to the idle state.

Referring back to FIG. 13, the event objects 1303–1304 track the events for each respective channel and indicate the events to the respective port objects 1301–1302. The event object 1303 can process events using a different thread than the port object 1301, and the event it object 204 can process events using a different thread than the port object 202. Multi-threaded processing in this manner has advantages. Multi-threading simplifies system design and is more efficient than a single-threaded system. Multi-threading allows multiple threads to be processed in various states at the same time without the entire system waiting for a single input. Multi-threading also simplifies race conditions to single channel events.

The API 1202 utilizes a messaging format comprised of an instruction followed by variables in parentheses. The primary instructions are:

start ring (channel ID)
stop ring (channel ID)
start tone (channel ID, tone type)
stop tone (channel ID, tone type)
wait event (channel ID, event type)
event (channel ID, event type, value)
open voice channel (channel ID, VPI/VCI)
close voice channel (channel ID, VPI/VCI)

In the above messages, the channel ID identifies the relevant channel of the hub 1204. The tone types are dial tone, ringback, busy, and fast-busy. The event types are off-hook, on-hook, and digit. The value is the value of the digit. The VPI/VCI identifies the Virtual Path and Virtual Channel used by the hub 1204 for the session.

The thread manager object 1305 provides fault tolerance for software failures and certain hardware failures. The thread manager object 1305 continuously receives heartbeat messages from the objects 1300–1304. If a heartbeat message is not received as expected, the thread manager object 1305 identifies and attempts to restart the affected thread. If the heartbeat is still absent, the thread manager object 1305 instructs the hub 1204 to use conventional fail-over analog telephone service for the channel with the malfunctioning thread.

Figure 15:
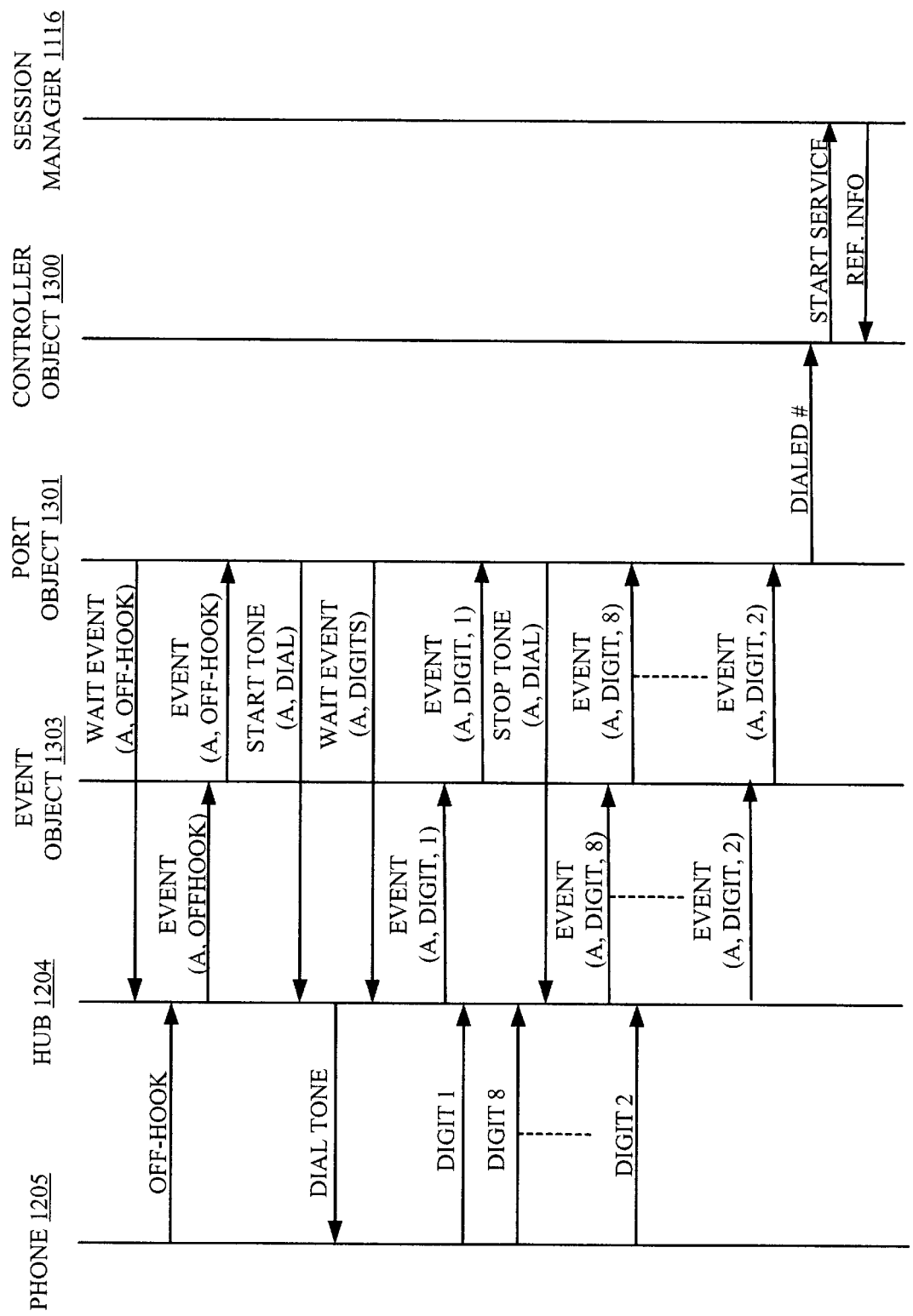
FIG. 15 is a message sequence chart depicting system operation in some embodiments of the invention.
Figure 16:
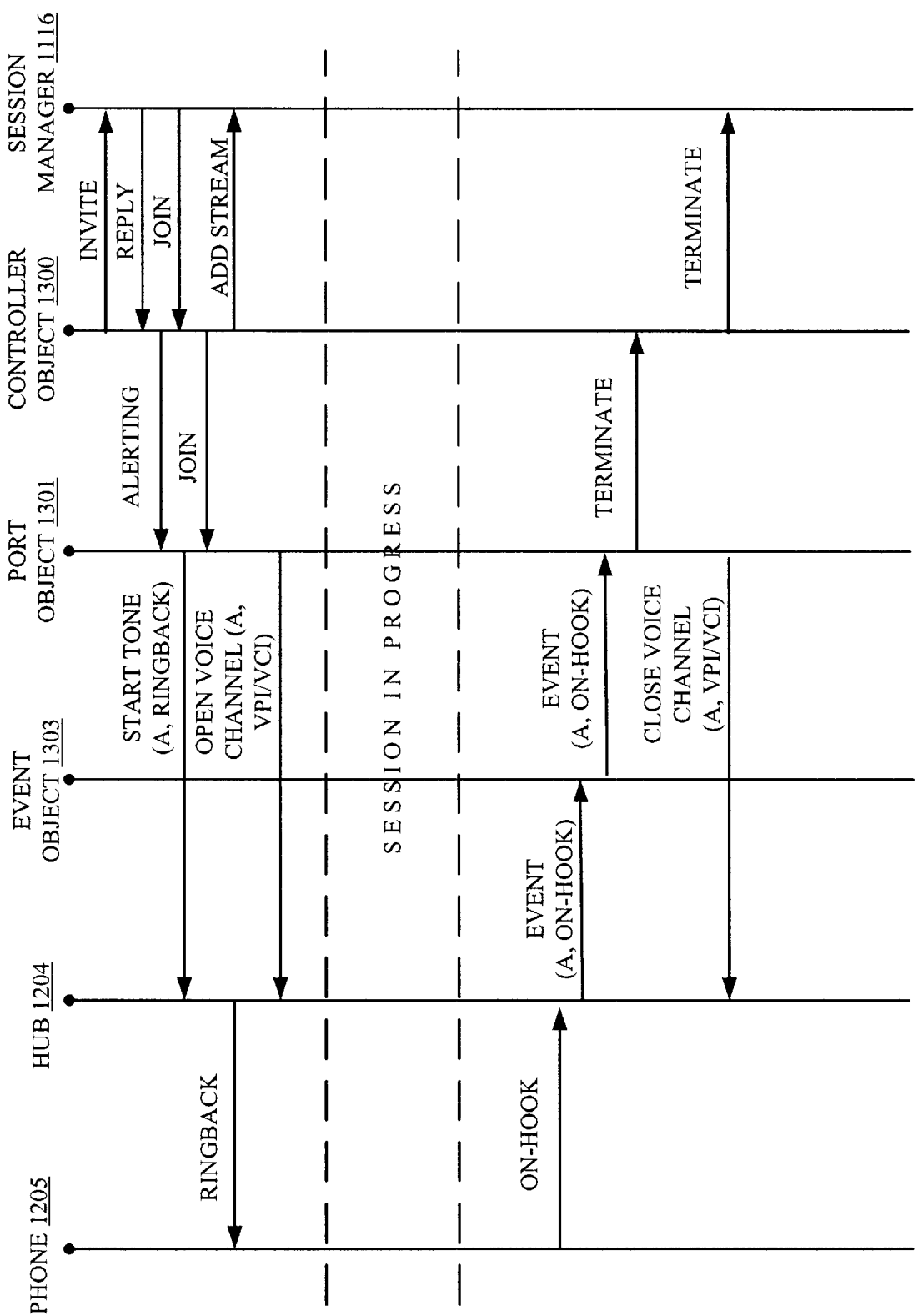
FIG. 16 is a message sequence chart depicting system operation in some embodiments of the invention.
Figure 17:
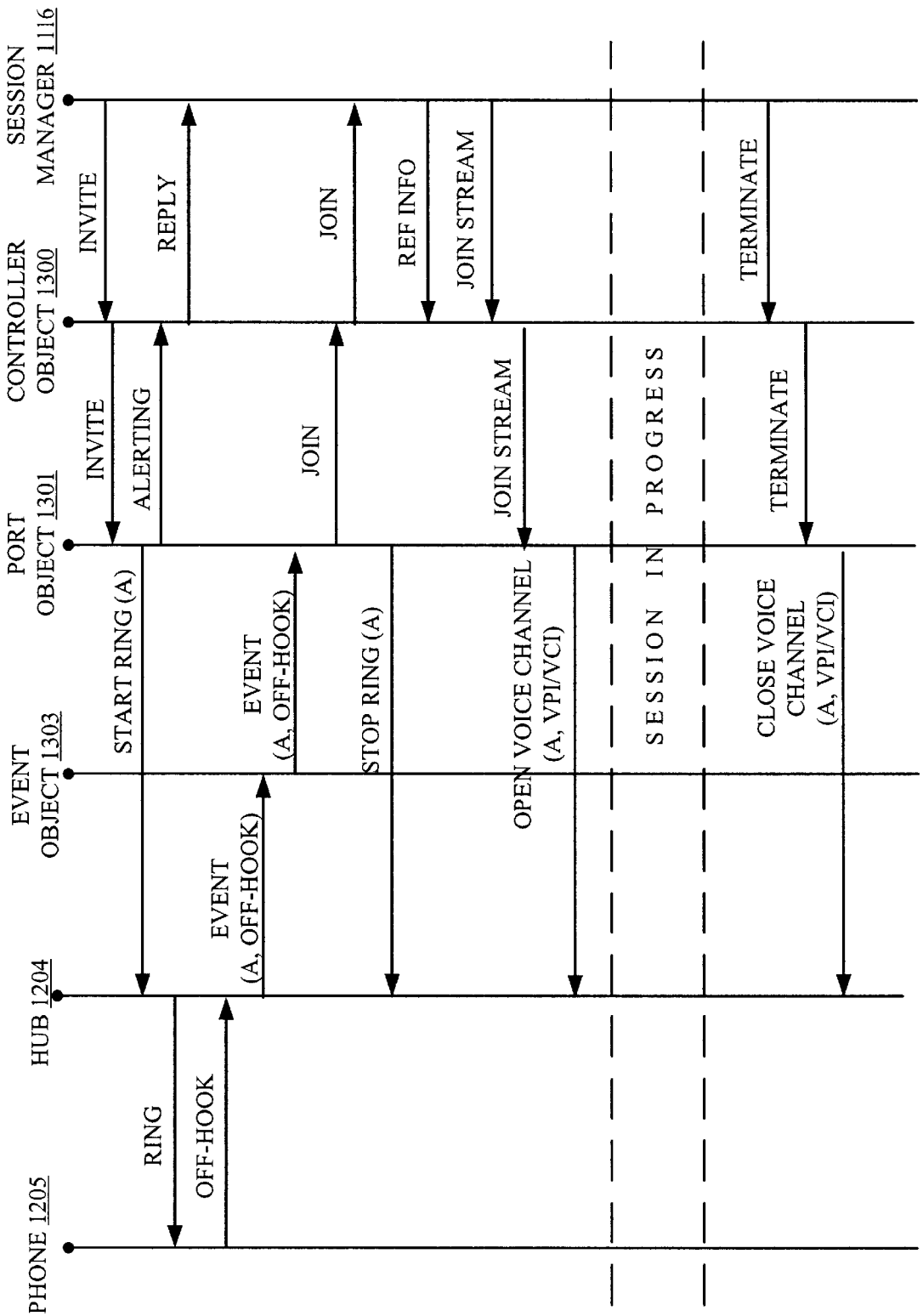
FIG. 17 is a message sequence chart depicting system operation in some embodiments of the invention.

Hub, Provider Agent, Session Manager Interaction—FIGS. 15–17

FIGS. 15–17 depict a message sequence chart for some operative examples of the invention. In the first example starting on FIG. 15, the port object 1301 sends "wait event (A, off-hook)" to the hub 1204. When the user places a call by taking the phone 1205 off-hook, the hub 1204 detects the off-hook event and transmits "event (A, off-hook)" to the event object 1303. Messages between the hub 1204 and the event object 1303 or the port object 1301 utilize the API 1202. The event object 1303 provides an off-hook indication to the port object 1301. The port object 1301 moves from the idle state to the dial tone state and responds to the hub 1204 with the messages "start tone (A, dial)" and "wait event (A, digit collection)". The port object 1301 also generates an instance of a digit collection object to process subsequently collected digits.

The user inputs a called number using the telephone 1205. The hub 1204 detects the digits and forwards the values to the event object 1303 with messages such as "event (A, digit, 1)" and "event (A, digit, 8)". The event object 1303 provides a digit indication to the port object 1301. After the first digit, the port object 1301 moves from the dial tone state to the digits state and sends "stop tone (A, dial)" to the hub 1204. In response, the hub 1204 stops the dial tone on channel A. The port object 1301 also processes the digit values with the digit collection object.

The digit collection object determines that the formatting of the called number is correct and that digit collection is complete. The digit collection object indicates to the port object 1301 that digit collection is complete and provides the called number. In response to the digits complete message, the port object 1301 moves from the digits state to the call proceeding state and indicates a request for telephony service with the dialed number to the controller object 1300.

The controller object 1300 generates and transmits a Start Service message requesting telephone service to the session manager 1116. The session manager responds with reference information such as the session ID, the party ID, and a secret ID. On FIG. 16, the controller object 1300 generates and transmits an invite message with the dialed number to the session manager 1116. The session manager 1116 typically sets-up the session and returns a reply message to the controller object 1300 indicating that the called party is being alerted. Alternatively, the called party might be busy or might reject the session.

If an alerting indication is received in the reply message, the controller object 1300 indicates the alerting condition to the port object 1301, and the port object moves to the ringback state. The port object 1301 sends "start tone (A, ringback) to the hub 1204. In response, the hub 1204 puts a ringback tone on channel A to emulate a ringing phone at the far end.

When the party at the far end accepts the invitation, a Join message is sent back to the controller object 1300. The controller object 1300 indicates the join condition to the port object 1301 and identifies the VPI/VCI for the session. The controller object 1300 also generates and transmits an add stream message to the session manager 1116 with the terminal ID, the party ID, and the VPI/VCI. The port object 1301 sends "open voice channel (A,VPI/VCI)" to the hub 1204. In response to the open voice channel message, the hub 1204 stops the ringback tone and interworks the analog telephony signal on channel A with the ATM signal on the VPI/VCI. At this point, the session is in progress and the telephone call can proceed.

The session ends when the user places the phone 1205 on-hook. The hub 1204 sends "event (A, on-hook)" to the event object 203 which indicates the on-hook to the port object 1301. The port object 1301 indicates the termination status to the controller object 1300 and sends "close voice channel (A, VPI/VCI)" to the hub 1204. The hub 1204 ceases to interwork channel A with the VPI/VCI. The controller object 1300 generates and transmits a Terminate message to the session manager 1116.

FIG. 17 depicts a call to the phone 1205 that is terminated by the other party. The controller object 1300 first receives an Invite message with a session ID and dialed number from the session manager 1116. The controller object 1300, based on its call-handling policy, determines which phone to route the call to. In some cases, the dialed number is used to select the appropriate phone. In this example, the call is routed to channel A. The controller object 1300 indicates the invitation to the port object 1301, and the port object 1301 sends "start ring (A)" to the hub 1204. The hub 1204 begins to ring the phone 1205. The controller object 1300 sends a reply message back to the session manager 1116 indicating that the user is being alerted. In the alternative, the reply message sent to the session manager 1116 could indicate that the phone 1205 was busy or that the session was rejected.

When the user takes the phone 1205 off-hook to answer the call, the hub 1204 sends "event (A, off-hook)" to the event object 1303 which indicates the off-hook to the port object 1301. The port object 1301 sends "stop ring (A)" the hub 1204 which stops the ringing. The port object 1301 informs the controller object 1300 that the user has joined the session and the controller object 1300 sends a join message to the session manager 1116. The controller object 1300 receives reference information from the session manager 1116 indicating the session ID, party ID, and secret ID. The controller object 1300 also receives a join stream message from the session manager 1116. The controller object sends a join stream indication to the port object 1301 identifying the VPI/VCI for the session. The port object 1301 sends "open voice channel (A,VPI/VCI)" to the hub 1204. At this point, the session manager 1116 has the information to set-up the connection. Subsequently, the session is in progress and the telephone call can proceed.

The session ends when a termination message is received by the controller object 1300 from the session manager 1116. The controller object 1300 indicates the termination status to the port object 1301 which sends "close voice channel (A, VPI/VCI)" to the hub 1204. The hub 1204 ceases to interwork channel A with the VPI/VCI.

It should be appreciated that various combinations of call origination and termination can occur in the context of the invention. For example the phone 1205 can originate a call or receive a call. Likewise, the phone 1205 can terminate a call or the called party can terminate a call. It should also be appreciated that the port object 1302 and the event object 1304 operate in a similar fashion to the port object 1301 and the event object 1303 respectively. Using these objects, the provider agent can handle multiple sessions at the same time. A provider agent can have numerous such objects, but only two groups are shown for purposes of clarity.

Race conditions exist when improper events occur given the current state of the port objects 1301–1302. This typically occurs when calls are incoming and outgoing at the same moment. One example is where an invite message is received by the controller object 1300, and the controller object 1300 determines that the status of channel A is idle, but in reality, the port object 1301 is already in the dial tone state due to an off-hook event. The port object 1301 will receive an invite indication from the controller object 1300 when it expects to receive digit indications from the event object 1303. In this case, the port object 1301 must instruct the controller object 1300 to reply busy or reject, and to set channel A status to busy.

In another example, the controller object 1300 may receive an invite message from the session manger 161, but before the phone 1205 rings, the phone 1205 goes off-hook. The port object 1301 will receive an invite indication from the controller object 1300 and an off-hook event from the hub 1204. In this case, the port object 1301 instructs the hub 1204 to open the voice channel and VPI/VCI for the incoming call as if the phone was answered for that call.

Figure 18:
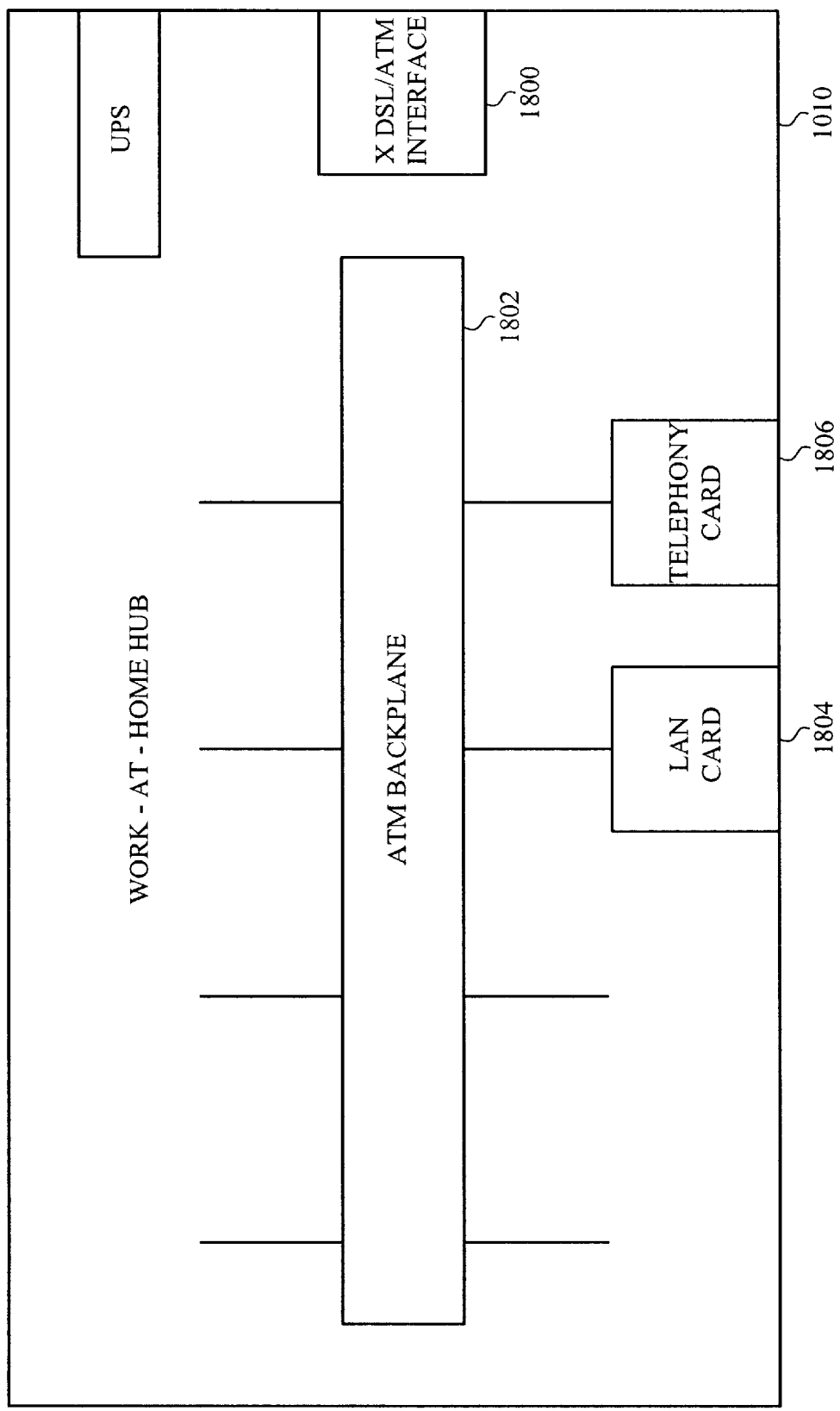
FIG. 18 is a block diagram of a Work-at-Home (WAH) hub in some embodiments of the invention.

The Work-at-Home Hub—FIG. 18

FIG. 18 depicts an example of the WAH hub 1010 in some embodiments of the invention. Conventional requirements for the WAH hub 1010 can be found in Telecommunications Industry Association (T1A) document SP-3771. Shown is the WAH hub 1010 and it includes an ADSL/ATM interface 1800 and an ATM backplane 1802. Together, these components allow for ATM communications within the hub 1010 and with external elements through the ADSL/ATM interface 1800. The ADSL/ATM interface 1800 converts end user control and communications into the ADSL/ATM format for transport to the service node 120. The provider agent 1200 and the session manager 1116 communicate through the ATM/ADSL interface 1800. The ATM/ADSL interface 1800 also receives communications and control from the network and provides these to the appropriate components of the hub 1010. The ADSL/ATM 1800 interface also provides smoothing and shaping for the ATM signals.

Several cards can be connected to ATM backplane 1802. In this example, a LAN card 1804 and a telephony card 1806 are shown. The cards can communicate with each other through s the ATM backplane 1802 and with the service node 120 through interface 1800. An un-interruptable power supply (UPS) may be included if desired in order to provide power during an outage to the home. The LAN card 1804 supports an ethernet connection to a computer. The computer could access the LAN 301 at the business 101 using IP over ATM through the ADSL/ATM interface 1800. The computer could also access the servers and routers in the service node 120 for additional services.

The telephony card 1806 supports analog telephony communications with the telephones. The telephony card 1806 is controlled by a provider agent that is resident in the hub 1010. The telephony card 1806 provides dial tone and power to the telephones. The telephony card 1806 can detect on-hook and off-hook conditions as well as DTMF tones. The telephony card 1806 I; can provide ringback and busy tones to the telephones. The telephony card 1806 can also provide analog to digital conversion In some embodiments, the telephony card 1806 provides echo cancellation or other digital signal processing functions. The provider agent for the telephony card 1806 exchanges control information (i.e. dialed number) with the session manager 1116 through ADSL/ATM interface 1800. One example of telephony card 1806 is provided by InnoMedia Logic (IML) of Quebec.

There are various connection options between the hub 1204 and the service node 120. ATM connections could be provisioned as PVP/PVCs from the hub 1204 directly to the service node 120. This tends to waste bandwidth in the metropolitan ATM network 111. Where the DSL multiplexer 817 is used, ATM connections could be provisioned from the hub 1204 to the multiplexer 817, and SVCs could be used between the multiplexer 817 and the service node 120. The entire connection between the hub 1204 and the service node 120 could establish SVCs as needed. In addition, combinations of the above could be provided. For example, low bandwidth control channels could be provisioned directly from the hub 1204 to the service node 120, but higher bandwidth bearer channels could be established on an SVC basis.

The traffic flows in Phase III can be the same as discussed above for Phases I and II, but traffic flows can also be determined by the session manager 11 16 and the provider agents. For example, the business may retain some dedicated PVC-based connections, and may replace some PVC-based connections with SVC capability using provider agents and the session manager. The use of SVCs is typically more efficient than the use of PVCs. When a user at the business 101 requests a communications service, the provider agent in the business hub 210 interacts with the session manager 1116 in the service node 120 to set-up the appropriate SVCs from the business hub 210 to the appropriate termination point of network 100. For on-net to on-net calls, an SVC would be established between the relevant hubs through the interaction of the session manager and the provider agents in the relevant hubs. The provider agents would also direct the conventional telephony operations for each respective telephone. For example, the provider agent may direct a PBX to complete the call or may direct a telephone to provide dial tone. For calls that either originate or terminate off-net, and SVC would be established from the business hub 210 to the PSTN gateway near the off-net party through the interaction of the session manager 1116 and the provider agents in the relevant hub and PSTN gateway. The provider agents would also direct the conventional telephony operations for each respective telephone. For example, the provider agent in the hub may direct a PBX to complete the call or may direct a telephone to ring, and the provider agent in the PSTN gateway may send or receive an SS7 Initial Address Message to the PSTN 150. The PSTN 150 would be used to originate or terminate the call to the off-net party.

The session manager 1116 and provider agents could also be used to establish data connections. On-net to on-net data connections might connect two ethernet LANs by an SVC to exchange data between computers. The hubs would interwork the ethernet LAN connection with the ATM SVC through the network. For off-net data, an SVC would be established from the relevant hub to: 1) the PSTN gateway to exchange data with the PSTN 150, 2) the service node router to exchange data with the Internet 160, or 3) the frame relay network 170 If the Internet site is on-net, the session manager 1116 will set-up an ATM SVC from the relevant hub to the hub or service node for the Internet site. For example, if a web site is in a server at the business 104, and a user at the business 101 seeks access to the web site, then the session manager 1116 would establish an SVC between the businesses 101 and 104. The Internet session would not need to access the Internet 160, but would be facilitated by the ATM network 100. The customers of the network 100 would have private, high-speed, SVC-based access to web servers that are on-net.

Figure 19:
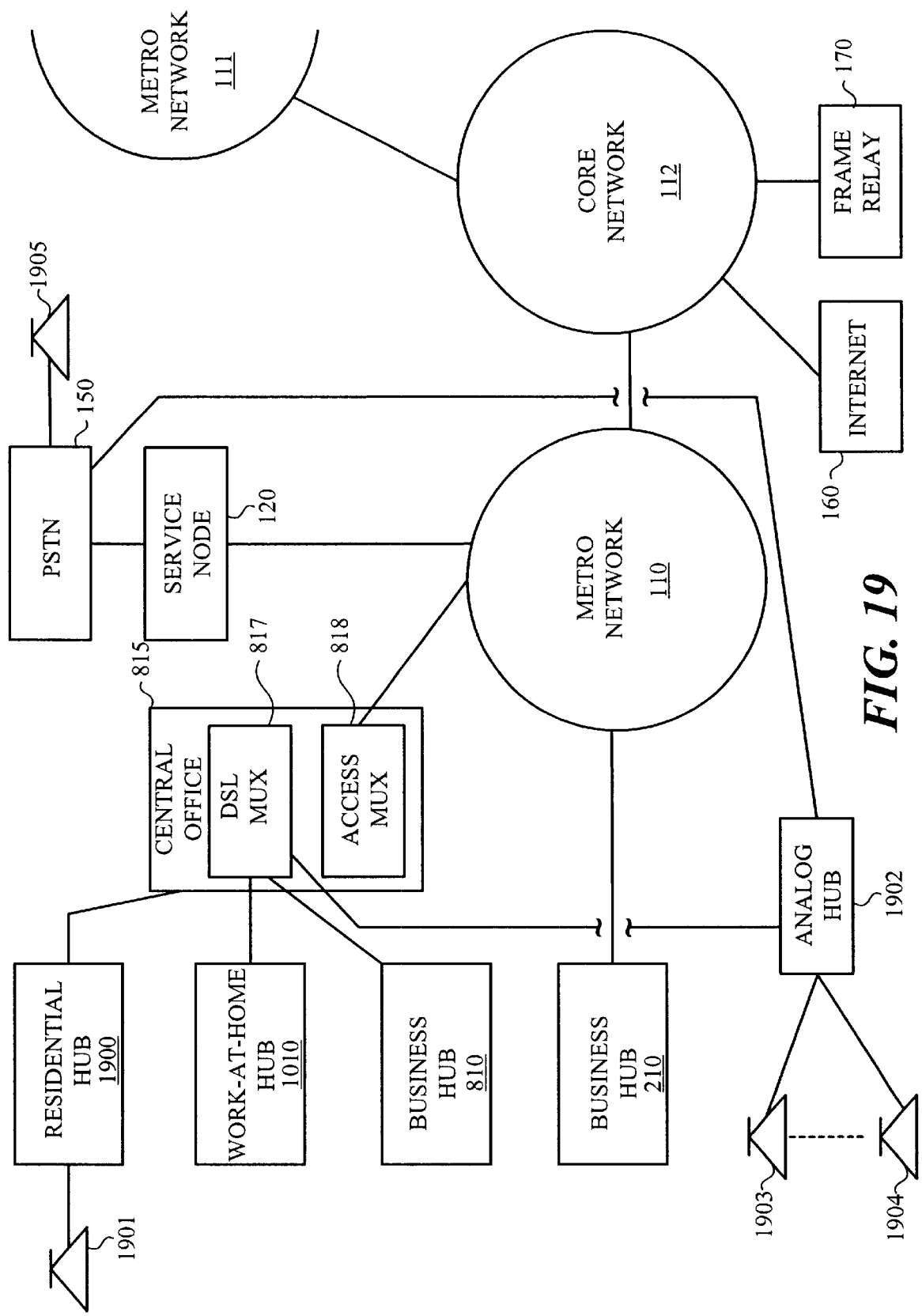
FIG. 19 is a block diagram of a Phase IV addition to the Phase III architecture in some embodiments of the invention.

Phase IV Architecture—FIG. 19

FIG. 19 depicts a Phase IV architecture. The following elements shown on FIG. 19 operate and are connected as described above: metropolitan ATM networks 110–111, core ATM network 112, service node 120, PSTN 150, Internet 170, frame relay network 170, business hub 210, business hub 810, central office 815, DSL multiplexer 817, ATM access multiplexer 818, and the WAH hub 1010. A residential hub 1900 and an analog hub 1902 that are representative of the hub 1204 have been added for Phase IV.

The residential hub 1900 is connected to a telephone 1901 at the residence. The residential hub 1900 is connected to the DSL multiplexer 817 in the central office 815 by an xDSL/ATM connection for access to the service node 120 through the ATM access multiplexer 818 and the metropolitan ATM network 110. The residential hub 1900 houses a provider agent and an ATM interface to serve the communications needs of the residence through the service node 120. Such services might include telephone calls, Internet 170 access, e-mail, and video, among others.

The analog hub 1902 is connected to the service node through the metropolitan ATM network 110. The analog hub 1902 is connected to multiple telephones 1903–1904 over conventional analog or Digital Loop Carrier (DLC) lines. The analog hub 1902 is also connected to a local network in the PSTN 150 by GR-303 connections. The analog hub 1902 provides conventional telephone service to customers who do not have residential hubs. The analog hub 1902 interworks between the conventional telephone format and the ATM format, and includes a provider agent that interacts with the session manager 1116 in the service node 120.

Figure 20:
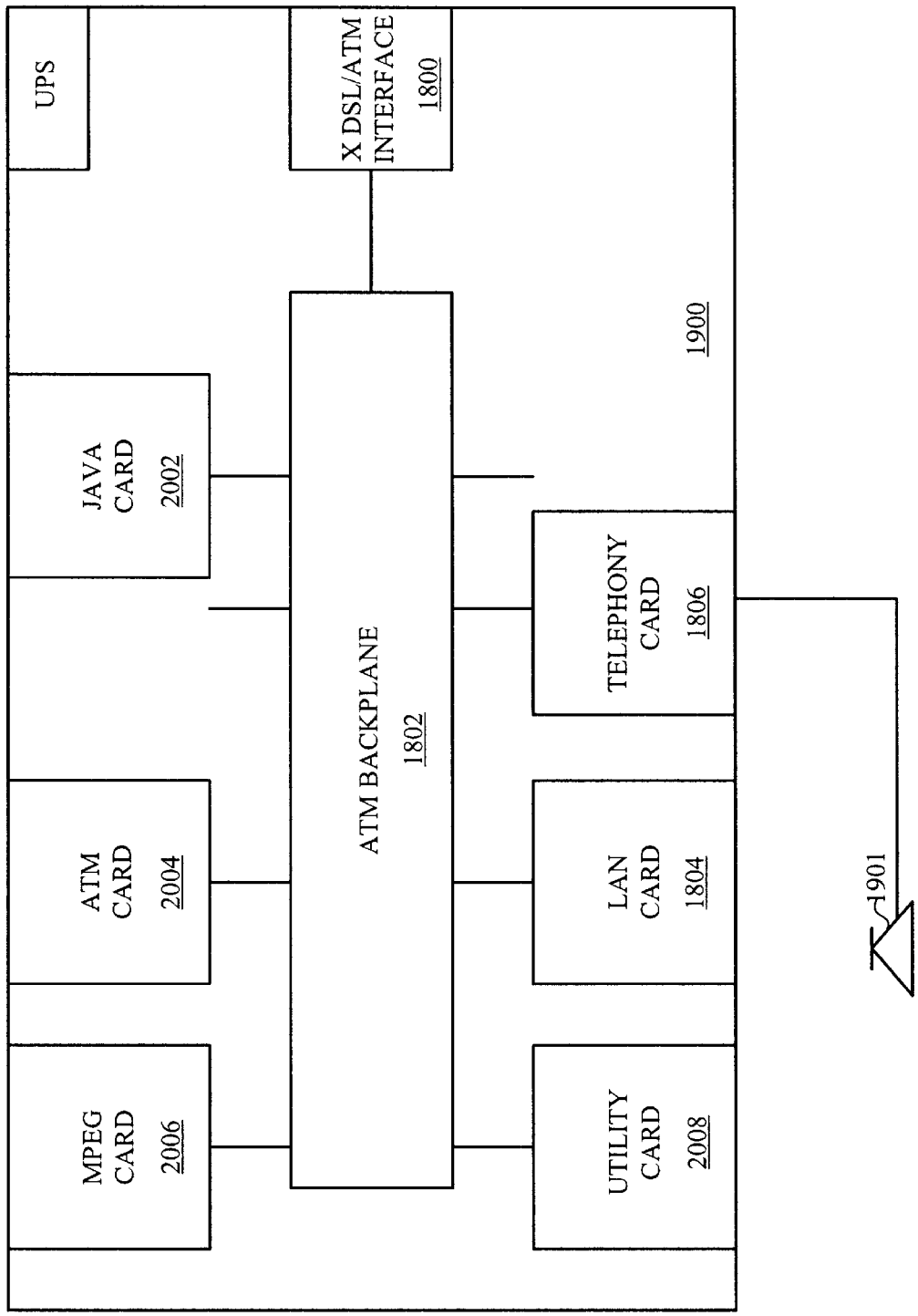
FIG. 20 is a block diagram of a residential hub in some embodiments of the invention.

The Residential Hub—FIG. 20

FIG. 20 depicts an example of the residential hub 1900 in some embodiments of the invention. Conventional requirements for the residential hub 1900 can be found in Telecommunications Industry Association (TIA) document SP-3771. The residential hub 1900 includes the ADSL/ATM interface 1800, the ATM backplane 1802, the LAN card 1804 and the telephony card 1806 from the WAH hub 1010. The residential hub 1900 could be adapted from the WAH hub 1010. The residential hub 1600 also includes a Java card, ATM card, MPEG card, and utility card that are connected to the ATM backplane 1802.

The ATM backplane 1802 is connected to the xDSL/ATM interface 1800 and these components allow for ATM communications within the hub 1900 and with external elements through xDSL/ATM interface 1800. The xDSL/ATM interface 1800 converts end user control and communications into the xDSL/ATM format for transport to the service node 120. The xDSL/ATM interface 1800 also receives communications and control from the service node 120 and provides the communications and control to the appropriate components of hub 1900. ADSL/ATM interface 1800 also provides smoothing and shaping for the ATM signals. The various cards can communicate with each other through the ATM backplane 1802. The cards can also communicate with the service node 120 through interface 1800. An un-interruptable power supply (UPS) may be included if desired in order to provide power during an outage to the residence.

The Java card 2002 includes a processor and memory and is operational to receive Java applets from the service node 120. Java applets can support a wide variety of tasks. In particular, Java applets can be used to provide the intelligence to support class 5 switch features for telephone service, such as call waiting and call forwarding. Java card 2002 also exerts control over the other cards and the xDSL/ATM interface 1800. This could include ATM virtual connection assignments for communications to the DSL multiplexer 817 or the service node 120. Java card 2002 may also communicate with the service node 120 to request numerous other communications services. The ATM card 2004 provides an ATM interface to devices within the residence. If the ATM card 2004 exchanges ATM signaling with resident devices over VPI=0 and VPI=5, then ATM card 2004 may use virtual path associated signaling to exchange control information with the service node 120. The MPEG card 2006 provides an MPEG interface to devices within the residence. MPEG is a video formatting standard provided by the Motion Picture Entertainment Group (MPEG). Typically, the MPEG card 2006 will receive MPEG formatted video in ATM cells through xDSL/ATM interface 1800 and provide video signals to devices in the residence. Utility card 2008 is coupled to utility metering devices in the residence. The utility card 2008 is programmed to collect the metering information and forward it to the utility companies through xDSL/ATM interface 1800. The LAN card 1804 supports a LAN that is internal to the residence. For example, LAN card 1804 could support ethernet connections to multiple computers. The computers could access the Internet 170 through the LAN card 1804 and the xDSL/ATM interface 1800.

The telephony card 1806 supports analog telephony communications with the telephone 1901 in the residence. Other telephones could also be supported but are not depicted for clarity. The telephony card 1806 is controlled by a provider agent that is resident in the residential hub 1900. The telephony card 1806 provides dial tone and power to the telephone 1901. The telephony card 1806 can detect on-hook and off-hook conditions as well as DTMF tones. The telephony card 1806 can provide ringback and busy tones to the telephone 1901. The telephony card 1806 can also provide analog to digital conversion In some embodiments, the telephony card 1806 provides echo cancellation or other digital signal processing functions. The provider agent for the telephony card 1806 exchanges control information (i.e. dialed number) with the session manager 1116 in the service node 120 through the xDSL/ATM interface 1800 or through the Java card 2002 and the xDSL/ATM interface 1800. One example of the telephony card 1806 is provided by InnoMedia Logic (IML) of Quebec.

Figure 21:
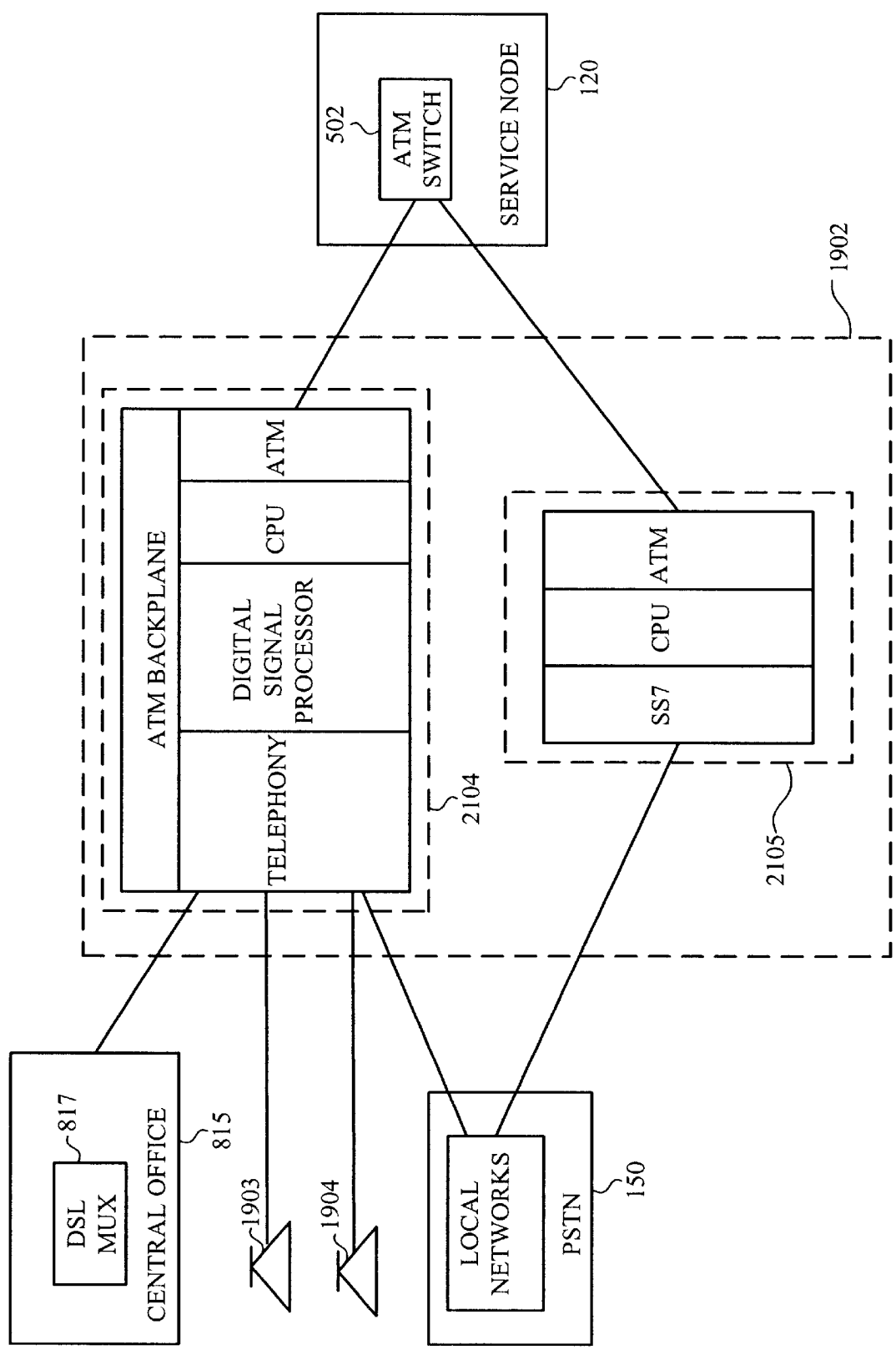
FIG. 21 is a block diagram of an analog hub in some embodiments of the invention.

The Analog Hub—FIG. 21

FIG. 21 depicts a version of the analog hub 1902. Shown are telephones 1903–1904, the DSL multiplexer 817 in the central office 815, the ATM switch 502 in the service node 120, and local networks within the PSTN 150. The metropolitan ATM network 111 is omitted for clarity. These components are connected as described with respect to FIG. 19. The analog hub 1902 is shown connected to only two phones 1903–1904 for reasons of clarity, but the analog hub 1902 is typically connected to approximately 200 phones on 200 channels.

The analog hub 1902 is comprised of connection element 2104 and control element 2105. Connection element 2104 comprised of a telephony interface, a digital signal processor (DSP), a central processing unit (CPU), an ATM interface, and an ATM backplane. The telephony interface provides an interface with DSL multiplexer 817, telephones 1903 and 1904, and the PSTN 150 over conventional telephony connections such as local loops, DLC signals, DS1 connections, and DS3 connections. The DSP provides echo cancellation and modem emulation. Other DSP functions could also be implemented. The CPU provides control. The ATM interface provides an interface to the ATM switch 502. The ATM backplane allows these elements to communicate and interact.

Control element 2105 is comprised of a Signaling System #7 interface, a CPU, and an ATM interface. The SS7 interface provides an interface with the SS7 components in the PSTN 150 over SS7 links. The CPU provides control and houses a provider agent for the telephone channels on the telephony interface. The ATM interface provides an interface to the ATM switch 502. Control element 2105 could be configured as a programmed Unix-based computer. Connection element 2104 and control element 2105 could be integrated onto a single platform, and the analog hub 1902 could be adapted from the LDR-2000 provided by Yurie Systems.

In operation the analog hub 1902 can support conventional telephony for telephones 1903–1904 using AAL1 based DS0 circuit emulation. The analog hub 1902 also would provide power, dial tone, digit collection, ring back, busy tone, and ringing. For outbound calls, the dialed digits would be forwarded to the provider agent in the CPU of the control element 2105. A call request message containing the dialed digits is generated by the provider agent and is converted to ATM by the control element 2105 and provided to the session manager 1116 in the service node 120 through the ATM switch 502. The provider agent in the control element 2105 would receive instructions from the session manager 1116 in the service node 120 through ATM switch 502 and exert control over the connection element 2104. The connection element 2104 would interwork the telephony signals from the telephones 1903–1904 with the appropriate ATM virtual connection to ATM switch 502 or to the PSTN 150 as appropriate. For inbound calls, the provider agent in the control element 2105 would receive an instruction from the session manager 1116 in the service node 120 through the ATM switch 502 to for a call to a particular telephone number. The provider agent would instruct the connection element 2104 to ring the telephone associated with that telephone number. Once the call is answered, connection element 2104 would interwork the telephony from the telephone with the appropriate ATM virtual connection to ATM switch 502 or to the PSTN 150 as appropriate. The analog hub 1902 uses conventional connections and SS7 signaling to transfer calls to and from the PSTN 150.

Phase IV Operation—FIG. 19

To illustrate the operation of the Phase IV architecture depicted in FIG. 19, a few examples will be discussed. One skilled in the art will appreciate that numerous other examples could also be supported by the invention. In the first example, the telephone 1904 is used to call the telephone 1901. A user takes the telephone 1904 off-hook. The analog hub 1902 senses the off-hook, and under control of the provider agent, provides dial tone to the telephone 1904. The user inputs the called number digits and the analog hub 1902 detects the digits. When the digits are collected, the provider agent in the analog hub 1902 requests a communications path for the call from the session manager 1116 in the service node 120.

The session manager 1116 in the service node 120 processes the called number and identifies the residential hub 1900 as the network termination point. The session manager 1116 instructs the provider agent in the residential hub 1900 to alert the telephone 1901, and the telephony card 1806 in the residential hub 1900 rings telephone 1901. The provider agent in the residential hub 1900 sends a reply through the session manager 1116 to the analog hub 1902 indicating that telephone 1901 is ringing. The provider agent in the analog hub 1902 causes the analog hub 1902 to play a ringback tone to telephone 1904 to emulate the ringing telephone for the caller. If the telephone 1901 had been busy, the reply would have indicated a busy status and the provider agent in the analog hub 1902 would have caused the analog hub 1902 to play a busy tone to the telephone 1904.

The session manager 1116 sends a control message to the ATM switch 502 in service node 120 to establish an SVC from the analog hub 1902 to the residential hub 1900 through the metropolitan ATM network 111 and the multiplexers 817–818. The connections between the residential hub 1900 and the telephone 1901 and between the analog hub 1902 and the telephone 1904 are conventional telephone connections.

If the telephone 1901 is answered, the telephony card 1806 in the residential hub 1900 detects the off-hook condition and the provider agent in the residential hub 1900 sends a message through the session manager 1116 to the provider agent in the analog hub 1902 that the called party has joined the call. The provider agent in the residential hub 1900 directs the telephony card 1806 to interwork the ATM connection with the conventional telephony connection to the telephone 1901. The provider agent in the analog hub 1902 directs the analog hub 1902 to interwork the ATM connection with the conventional telephony connection to the telephone 1904. At this point, the call connection is established. When either telephone 1901 or 1904 hangs up, the respective hub 1900 or 1902 will detect the on-hook condition and the associated provider agent will send a termination message through the session manager 1116 to the other provider agent. As a result, the ATM connections and the connections to the telephones 1901 and 1904 are released.

The above example represents an on-net call. Other on-net calls could be handled in a similar fashion for any telephones that are connected to a business hub, WAH hub, residential hub, or analog hub. The SVCs for the calls can be set-up in between these hubs through the metropolitan ATM networks 110–111 and the core ATM network 112. Advantageously, the ATM fabric that is used to provide Internet, video, and data communications is also used to provide conventional telephone service—even to users who only have conventional telephones and desire only standard telephone service.

In the next example, the telephone 1901 is used for an off-net call to a telephone 1905 that is connected to the PSTN 150. A user takes the telephone 1901 off-hook. The telephony card 1806 in the residential hub 1900 senses the off-hook, and under control of the provider agent, provides dial tone to the telephone 1901. The user inputs the called number digits and the telephony card 1806 detects the digits. When the digits are collected, the provider agent requests a communications path for the call from the session manager 1116 in the service node 120.

The session manager 1116 in the service node 120 processes the called number and identifies the PSTN gateway 508 as the network termination point. The session manager 1116 instructs the provider agent in the PSTN gateway 508 to alert the telephone 1905, and the PSTN gateway 508 sends an SS7 IAM that includes the dialed number to the PSTN 150. The PSTN 150 rings the telephone. 1905 and responds to the PSTN gateway 508 with an SS7 Address Complete Message (ACM) with an alerting indication. The provider agent in the PSTN gateway 508 sends a reply through the session manager 1116 to the residential hub 1900 indicating that telephone 1905 is ringing. The provider agent in the residential hub 1900 causes the telephony card 1806 to play a ringback tone to telephone 1901 to emulate the ringing telephone for the caller. If the telephone 1905 had been busy, the ACM from the PSTN 150 and the reply from the PSTN gateway 508 would have indicated a busy status, and the provider agent in the residential hub 1900 would have caused the telephony card 1806 to play a busy tone to the telephone 1901.

The session manager 1116 sends a control message to the ATM switch 502 in service node 120 to establish an SVC from the residential hub 1900 to the PSTN gateway 508 through the metropolitan ATM network 111 and the multiplexers 817–818. The connections between the residential hub 1900 and the telephone 1901 and between the PSTN gateway 508 and the telephone 1905 are conventional telephone connections.

If the telephone 1905 is answered, the PSTN 150 detects the off-hook condition and sends an SS7 Answer Message (ANM) to the PSTN gateway 508. The provider agent in the PSTN gateway 508 sends a message through the session manager 1116 to the provider agent in the residential hub 1900 that the called party has joined the call. The provider agent in the PSTN gateway instructs the PSTN gateway 508 to interwork the ATM connection with the conventional telephony connection to the telephone 1905. The provider agent in the residential hub 1900 directs the telephony card 1806 to interwork the ATM connection with the conventional telephony connection to the telephone 1901. At this point, the call connection is established. When either telephone 1901 or 1905 hangs up, the residential hub 1900 or the PSTN 150 will detect the on-hook condition and the associated provider agent will send a termination message through the session manager 1116 to the other provider agent. As a result, the ATM connections and the connections to the telephones 1901 and 1904 are released.

The above example represents an off-net call. Other off-net calls could be handled in a similar fashion to or from for any telephones that are connected to the PSTN 150. The SVCs for the calls can be set-up in between any hub and any PSTN gateway through the metropolitan ATM networks 110–111 and the core ATM network 110. Advantageously, the ATM fabric that is used to provide Internet, video, and data communications is also used to provide conventional telephone service—even to users who only have conventional telephones and desire only standard telephone service.

The residential hub 1900 may be required to handle an emergency 911 call from the telephone 1901. Typically, the call is handled as indicated above, but if systems are down or the power to the residential hub 1900 has failed, the residential hub 1900 and the DSL multiplexer 817 can be adapted to automatically connect the affected local loop to the analog hub 1902. The analog hub 1902 can then power the phone 1901 and provide conventional telephone service to the telephone 1901.

An important feature of the provider agents, the residential hub 1900, and the analog hub 1902 is the support of POTS service by providing a proxy. The telephones operate in their normal manner, and the agents and hubs provide an "interpreter" between the telephones and the session manager 1116. This "interpreter" function is a proxy. A proxy could also be provided for legacy Internet communications. When a computer at a residence attempted an Internet communication, the proxy would intercept the IP packet. The proxy could either translate the IP address into a destination and provide the destination to the session manager 1116, or simply forward the IP address the session manager 1116. Either way, the session manager would set up an ATM SVC to the destination if the destination is on-net. If the destination is off-net, an SVC to the appropriate on-net router would be used for subsequent Internet access. The legacy application on the computer could communicate using IP addressing, but would be supplied with ATM connections using the proxy.

Those skilled in the art can appreciate variations of the above-described embodiments that fall within the scope of the invention. As a result, the invention is not limited to the specific embodiments discussed above, but only by the following claims and their equivalents.

What is claimed is:

1. A communications network that comprises:
    a first metropolitan Asynchronous Transfer Mode (ATM) network;
    a first business hub that is connected to the first metropolitan ATM network;
    a second business hub that is connected to the first metropolitan ATM network;
    a Public Switched Telephone Network (PSTN) gateway that is connected to the first ATM metropolitan network;
    a first ATM Permanent Virtual Connection (PVC) from the first business hub to the second business hub through the first metropolitan ATM network;
    a second ATM PVC from the first business hub to the PSTN gateway through the first metropolitan ATM network wherein the PSTN gateway is operational to interwork the second ATM PVC with a connection to a local telephone network; and a third ATM PVC from the first business hub to the PSTN gateway through the first metropolitan ATM network wherein the PSTN gateway is operational to interwork the third ATM PVC with a connection to a long distance telephone network.

2. The communications network of claim 1 wherein the communications network includes the local telephone network.

3. The communications network of claim 1 wherein the communications network includes the long distance telephone network.

4. The communications network of claim 1 further comprising:
   a core ATM network that is connected to the first metropolitan ATM network; and
   a fourth ATM PVC from the first business hub to a data network through the first metropolitan ATM network and the core ATM network.

5. The communications network of claim 4 wherein the data network is an Internet.

6. The communications network of claim 5 wherein the communications network further comprises an Internet Service Provider (ISP) and the fourth ATM PVC is from the first business hub to the ISP and wherein the ISP is operational to interwork the fourth ATM PVC with the Internet.

7. The communications network of claim 4 wherein the data network is a frame relay network.

8. The communications network of claim 7 wherein the communications network further comprises the frame relay network and the fourth ATM PVC is from the first business hub to the frame relay network and wherein the frame relay network is operational to interwork the fourth ATM PVC with a frame relay connection.

9. The communications network of claim 4 wherein the communications network includes the data network.

10. The communications network of claim 1 further comprising:
    a core ATM network that is connected to the first metropolitan ATM network;
    a second metropolitan ATM network that is connected to the core ATM network;
    a third business hub that is connected to the second metropolitan ATM network; and
    a fourth ATM PVC from the first business hub to the third business hub through the first metropolitan ATM network, the core ATM network, and the second metropolitan ATM network.

11. The communications network of claim 10 wherein the communications network further comprises:
    the long distance telephone network;
    a second PSTN gateway that is connected to the second metropolitan ATM network; and
    a fifth ATM PVC from the third business hub to the second PSTN gateway through the second metropolitan ATM network, wherein the second PSTN gateway is operational to interwork the fifth ATM PVC with a connection to the long distance telephone network, and wherein the communications network is operational to connect a call through the first business hub, the third ATM PVC, the long distance network, the fifth ATM PVC, and the third business hub.

12. The communications network of claim 1 wherein the first business hub is operational to interwork between ATM and a plurality of different formats.

13. The communications network of claim 12 wherein the first business hub has an ethernet interface and an ATM interface.

14. The communications network of claim 12 wherein the first business hub has an fiber distributed data interface and an ATM interface.

15. The communications network of claim 12 wherein the first business hub has a V.35 interface and an ATM interface.

16. The communications network of claim 12 wherein the first business hub has an RS-422 interface and an ATM interface.

17. The communications network of claim 12 wherein the first business hub has a high speed serial interface and an ATM interface.

18. The communications network of claim 12 wherein the first business hub has a DS3 interface and an ATM interface.

19. The communications network of claim 12 wherein the first business hub has an T1 interface and an ATM interface.

20. The communications network of claim 12 wherein the first business hub has an Internet Protocol interface and an ATM interface.

21. The communications network of claim 12 wherein the first business hub has a frame relay interface and an ATM interface.

22. The communications network of claim 12 wherein the first business hub has an OC-3 to interface and an ATM interface.

23. The communications network of claim 12 wherein the first business hub has an OC-12 interface and an ATM interface.

24. The communications network of claim 1 wherein the communications network includes a service node that is connected to the first metropolitan ATM network and that includes an ATM switch.

25. The communications network of claim 1 wherein the communications network includes a service node that is connected to the first metropolitan ATM network and that includes a router.

26. The communications network of claim 1 wherein the communications network includes a service node that is connected to the first metropolitan ATM network and that includes the PSTN gateway.

27. The communications network of claim 1 wherein the communications network includes a service node that is connected to the first metropolitan ATM network and that includes a web server.

28. The communications network of claim 27 wherein the web server is operational to provide a customer with service subscription information.

29. The communications network of claim 27 wherein the web server is operational to provide a customer with a graphical depiction of at least portions of the communications network that provide service to the customer.

30. The communications network of claim 27 wherein the web server is operational to provide a customer with communications network performance information.

31. The communications network of claim 27 wherein the web server is operational to provide a customer with communications network status information.

32. The communications network of claim 1 further comprising:
    an ATM access multiplexer that is connected to the first metropolitan ATM network;
    a Digital Subscriber Line (DSL) multiplexer that is connected to the ATM access multiplexer; and
    a third business hub that is connected to the DSL multiplexer by a DSL/ATM connection.

33. The communications network of claim 32 wherein the ATM access multiplexer and the DSL multiplexer are located in a central office.

34. A method for deploying a communications network that comprises:

(a) deploying a first network architecture that is comprised of a plurality of first business hubs that are each connected to a metropolitan ATM network that is connected to a core ATM network and that are each operational to interwork between ATM and a plurality of different formats and, wherein each first business hub has a first ATM Permanent Virtual Connection (PVC) that is connected through the metropolitan ATM network to a Public Switched Telephone Network (PSTN) gateway that interworks the first ATM PVC with a connection to a local telephone network, wherein each first business hub has a second ATM PVC that is connected through the metropolitan ATM network to the PSTN gateway that interworks the second ATM PVC with a connection to a long distance telephone network, wherein each first business hub has a third ATM PVC that is connected through the metropolitan ATM network and the core ATM network to a data network;

(b) deploying a second network architecture by adding an ATM access multiplexer that is connected to the metropolitan ATM network, by adding a Digital Subscriber Line (DSL) multiplexer that is connected to the ATM access multiplexer, and by adding a plurality of second business hubs that are each connected to the DSL multiplexer and that are each operational to interwork between ATM and a plurality of different formats;

(c) deploying a third network architecture by adding a plurality of work-at-home hubs that are each connected to the DSL multiplexer and that are each operational to interwork between ATM and a plurality of different formats, by adding a session manager that is connected to the metropolitan ATM network, and by adding provider agents to the PSTN gateway and to the work-at-home hubs wherein the provider agents and the session manager are operational to establish Switched Virtual Circuits (SVCs) that interconnect the work-at-home hubs and the PSTN gateway; and (d) deploying a fourth network architecture by adding a plurality of residential hubs that are each connected to the DSL multiplexer and that are each operational to interwork between ATM and a plurality of different formats, and by adding a plurality of analog hubs that are each connected to the metropolitan ATM network and that are each operational to interwork between ATM and conventional telephony connections, and wherein the provider agents are added to each of the residential hubs and the analog hubs.

* * * * *